(12) United States Patent
Koizumi et al.

(10) Patent No.: US 7,352,713 B2
(45) Date of Patent: Apr. 1, 2008

(54) MULTIPLEXED SIGNAL QUALITY DISPLAY SYSTEM, METHOD, AND PROGRAM, AND STORAGE MEDIUM STORING THE PROGRAM

(75) Inventors: Satoshi Koizumi, Tokyo (JP); Juichi Nakada, Tokyo (JP); Eiji Nishino, Tokyo (JP); Hideki Ichikawa, Tokyo (JP)

(73) Assignee: Advantest Corporation, Tokyo (JP)

( * ) Notice: Subject to any disclaimer, the term of this patent is extended or adjusted under 35 U.S.C. 154(b) by 1001 days.

(21) Appl. No.: 10/297,476

(22) PCT Filed: Jun. 8, 2002

(86) PCT No.: PCT/JP01/04845

§ 371 (c)(1),
(2), (4) Date: Jul. 3, 2003

(87) PCT Pub. No.: WO01/97421

PCT Pub. Date: Dec. 20, 2001

(65) Prior Publication Data

US 2004/0004953 A1 Jan. 8, 2004

(30) Foreign Application Priority Data

Jun. 12, 2000 (JP) ............... P2000-175176

(51) Int. Cl.
*H04J 11/00* (2006.01)
*G06F 17/00* (2006.01)

(52) U.S. Cl. ............... 370/320; 370/209; 715/526

(58) Field of Classification Search ............... 370/320, 370/209; 715/526
See application file for complete search history.

(56) References Cited

U.S. PATENT DOCUMENTS 6,219,340 B1 * 4/2001 Cutler et al. ............... 370/241
6,628,929 B1 * 9/2003 Nomura ............... 455/126

FOREIGN PATENT DOCUMENTS

DE 199 55 564 5/2000

(Continued)

OTHER PUBLICATIONS

Tsuneo Ishibashi; CDMA wo dou Keisoku Hyouka suruka? Electronics, Mar. 1997, vol. 42, No. 3, pp. 46 to 48.

(Continued)

*Primary Examiner*—Charles N. Appiah
*Assistant Examiner*—Joel Ajayi
(74) *Attorney, Agent, or Firm*—Greenblum & Bernstein, P.L.C.

(57) ABSTRACT

A multiplexed signal quality display system, method, and program, and recorded medium where the program is recorded. The invention measures the quality of a multiplexed signal from a communication device wherein a band width to be used and the number of communication channels capable of being accommodated are determined by a diffusion code length, and channels to be used having the number of communication channels, which are determined by a diffusion code length, are decided in terms of a diffusion code number affixed to the type of the diffusion code, to effect communication while ensuring multi-channel communication lines in one and same band.

37 Claims, 19 Drawing Sheets

| | FOREIGN PATENT DOCUMENTS | |
|---|---|---|
| DE | 19955564 A1 | 5/2000 |
| EP | 0 847 153 | 6/1998 |
| GB | 2 338 378 | 12/1999 |
| JP | 9-307525 A | 11/1997 |
| JP | 10-173628 A | 6/1998 |
| JP | 2000-36802 A | 2/2000 |
| JP | 2000-134180 A | 5/2000 |
| JP | 2001-189711 A | 7/2001 |

OTHER PUBLICATIONS

Kiyoshi Hashiba et al; "CDMA Shingou no Hyouka Gujutsu"; Probo, (1997), No. 10, pp. 15 to 18.

3$^{rd}$ Generation Partnership Project; Technical Specification Group Terminal; Terminal Conformance Specification; Radio Transmission and Reception (TDD) (Release 1999). 3G TS 34.122. V1.2.1 (Mar. 2000), XP-002315905.

* cited by examiner $$\begin{bmatrix} \dfrac{\partial \varepsilon^2}{\partial \Delta \omega} \\ \dfrac{\partial \varepsilon^2}{\partial \Delta a_n} \\ \dfrac{\partial \varepsilon^2}{\partial \Delta \tau_n} \\ \dfrac{\partial \varepsilon^2}{\partial \Delta \theta_n} \end{bmatrix} \begin{bmatrix} \Delta\omega & \Delta a_i & \Delta\tau_i & \Delta\theta_i \\ p_{(\Delta\omega\Delta\omega)} & p_{(\Delta\omega\Delta a_0)}\cdots p_{(\Delta\omega\Delta a_j)}\cdots p_{(\Delta\omega\Delta a_{63})} & p_{(\Delta\omega\Delta\tau_0)}\cdots p_{(\Delta\omega\Delta\tau_j)}\cdots p_{(\Delta\omega\Delta\tau_{63})} & p_{(\Delta\omega\Delta\theta_0)}\cdots p_{(\Delta\omega\Delta\theta_j)}\cdots p_{(\Delta\omega\Delta\theta_{63})} \\ p_{(\Delta a_0\Delta\omega)} & p_{(\Delta a_0\Delta a_0)}\cdots p_{(\Delta a_0\Delta a_j)}\cdots p_{(\Delta a_0\Delta a_{63})} & p_{(\Delta a_0\Delta\tau_0)}\cdots p_{(\Delta a_0\Delta\tau_j)}\cdots p_{(\Delta a_0\Delta\tau_{63})} & p_{(\Delta a_0\Delta\theta_0)}\cdots p_{(\Delta a_0\Delta\theta_j)}\cdots p_{(\Delta a_0\Delta\theta_{63})} \\ p_{(\Delta a_j\Delta\omega)} & p_{(\Delta a_j\Delta a_0)}\cdots p_{(\Delta a_j\Delta a_j)}\cdots p_{(\Delta a_j\Delta a_{63})} & p_{(\Delta a_j\Delta\tau_0)}\cdots p_{(\Delta a_j\Delta\tau_j)}\cdots p_{(\Delta a_j\Delta\tau_{63})} & p_{(\Delta a_j\Delta\theta_0)}\cdots p_{(\Delta a_j\Delta\theta_j)}\cdots p_{(\Delta a_j\Delta\theta_{63})} \\ p_{(\Delta a_{63}\Delta\omega)} & p_{(\Delta a_{63}\Delta a_0)}\cdots p_{(\Delta a_{63}\Delta a_j)}\cdots p_{(\Delta a_{63}\Delta a_{63})} & p_{(\Delta a_{63}\Delta\tau_0)}\cdots p_{(\Delta a_{63}\Delta\tau_j)}\cdots p_{(\Delta a_{63}\Delta\tau_{63})} & p_{(\Delta a_{63}\Delta\theta_0)}\cdots p_{(\Delta a_{63}\Delta\theta_j)}\cdots p_{(\Delta a_{63}\Delta\theta_{63})} \\ p_{(\Delta\tau_0\Delta\omega)} & p_{(\Delta\tau_0\Delta a_0)}\cdots p_{(\Delta\tau_0\Delta a_j)}\cdots p_{(\Delta\tau_0\Delta a_{63})} & p_{(\Delta\tau_0\Delta\tau_0)}\cdots p_{(\Delta\tau_0\Delta\tau_j)}\cdots p_{(\Delta\tau_0\Delta\tau_{63})} & p_{(\Delta\tau_0\Delta\theta_0)}\cdots p_{(\Delta\tau_0\Delta\theta_j)}\cdots p_{(\Delta\tau_0\Delta\theta_{63})} \\ p_{(\Delta\tau_j\Delta\omega)} & p_{(\Delta\tau_j\Delta a_0)}\cdots p_{(\Delta\tau_j\Delta a_j)}\cdots p_{(\Delta\tau_j\Delta a_{63})} & p_{(\Delta\tau_j\Delta\tau_0)}\cdots p_{(\Delta\tau_j\Delta\tau_j)}\cdots p_{(\Delta\tau_j\Delta\tau_{63})} & p_{(\Delta\tau_j\Delta\theta_0)}\cdots p_{(\Delta\tau_j\Delta\theta_j)}\cdots p_{(\Delta\tau_j\Delta\theta_{63})} \\ p_{(\Delta\tau_{63}\Delta\omega)} & p_{(\Delta\tau_{63}\Delta a_0)}\cdots p_{(\Delta\tau_{63}\Delta a_j)}\cdots p_{(\Delta\tau_{63}\Delta a_{63})} & p_{(\Delta\tau_{63}\Delta\tau_0)}\cdots p_{(\Delta\tau_{63}\Delta\tau_j)}\cdots p_{(\Delta\tau_{63}\Delta\tau_{63})} & p_{(\Delta\tau_{63}\Delta\theta_0)}\cdots p_{(\Delta\tau_{63}\Delta\theta_j)}\cdots p_{(\Delta\tau_{63}\Delta\theta_{63})} \\ p_{(\Delta\theta_0\Delta\omega)} & p_{(\Delta\theta_0\Delta a_0)}\cdots p_{(\Delta\theta_0\Delta a_j)}\cdots p_{(\Delta\theta_0\Delta a_{63})} & p_{(\Delta\theta_0\Delta\tau_0)}\cdots p_{(\Delta\theta_0\Delta\tau_j)}\cdots p_{(\Delta\theta_0\Delta\tau_{63})} & p_{(\Delta\theta_0\Delta\theta_0)}\cdots p_{(\Delta\theta_0\Delta\theta_j)}\cdots p_{(\Delta\theta_0\Delta\theta_{63})} \\ p_{(\Delta\theta_j\Delta\omega)} & p_{(\Delta\theta_j\Delta a_0)}\cdots p_{(\Delta\theta_j\Delta a_j)}\cdots p_{(\Delta\theta_j\Delta a_{63})} & p_{(\Delta\theta_j\Delta\tau_0)}\cdots p_{(\Delta\theta_j\Delta\tau_j)}\cdots p_{(\Delta\theta_j\Delta\tau_{63})} & p_{(\Delta\theta_j\Delta\theta_0)}\cdots p_{(\Delta\theta_j\Delta\theta_j)}\cdots p_{(\Delta\theta_j\Delta\theta_{63})} \\ p_{(\Delta\theta_{63}\Delta\omega)} & p_{(\Delta\theta_{63}\Delta a_0)}\cdots p_{(\Delta\theta_{63}\Delta a_j)}\cdots p_{(\Delta\theta_{63}\Delta a_{63})} & p_{(\Delta\theta_{63}\Delta\tau_0)}\cdots p_{(\Delta\theta_{63}\Delta\tau_j)}\cdots p_{(\Delta\theta_{63}\Delta\tau_{63})} & p_{(\Delta\theta_{63}\Delta\theta_0)}\cdots p_{(\Delta\theta_{63}\Delta\theta_j)}\cdots p_{(\Delta\theta_{63}\Delta\theta_{63})} \end{bmatrix} \begin{bmatrix} \Delta\omega \\ \Delta a_i \\ \Delta\tau_i \\ \Delta\theta_i \end{bmatrix} = \begin{bmatrix} p_{\Delta\omega Const.} \\ p_{\Delta a_0 Const.} \\ \vdots \\ p_{\Delta a_j Const.} \\ p_{\Delta a_{63} Const.} \\ p_{\Delta\tau_0 Const.} \\ \vdots \\ p_{\Delta\tau_j Const.} \\ p_{\Delta\tau_{63} Const.} \\ p_{\Delta\theta_0 Const.} \\ \vdots \\ p_{\Delta\theta_j Const.} \\ p_{\Delta\theta_{63} Const.} \end{bmatrix}$$

Walsh Code Length L=8

A

| Ordinary Order of Walsh Code | Walsh Code | | | | | | | |
|---|---|---|---|---|---|---|---|---|
| 0 | 0 | 0 | 0 | 0 | 0 | 0 | 0 | 0 |
| 1 | 0 | 1 | 0 | 1 | 0 | 1 | 0 | 1 |
| 2 | 0 | 0 | 1 | 1 | 0 | 0 | 1 | 1 |
| 3 | 0 | 1 | 1 | 0 | 0 | 1 | 1 | 0 |
| 4 | 0 | 0 | 0 | 0 | 1 | 1 | 1 | 1 |
| 5 | 0 | 1 | 0 | 1 | 1 | 0 | 1 | 0 |
| 6 | 0 | 0 | 1 | 1 | 1 | 1 | 0 | 0 |
| 7 | 0 | 1 | 1 | 0 | 1 | 0 | 0 | 1 |

Walsh Code Length L=8

B

| Paley Order of Walsh Code | Walsh Code | | | | | | | |
|---|---|---|---|---|---|---|---|---|
| 0 | 0 | 0 | 0 | 0 | 0 | 0 | 0 | 0 |
| 4 | 0 | 0 | 0 | 0 | 1 | 1 | 1 | 1 |
| 2 | 0 | 0 | 1 | 1 | 0 | 0 | 1 | 1 |
| 6 | 0 | 0 | 1 | 1 | 1 | 1 | 0 | 0 |
| 1 | 0 | 1 | 0 | 1 | 0 | 1 | 0 | 1 |
| 5 | 0 | 1 | 0 | 1 | 1 | 0 | 1 | 0 |
| 3 | 0 | 1 | 1 | 0 | 0 | 1 | 1 | 0 |
| 7 | 0 | 1 | 1 | 0 | 1 | 0 | 0 | 1 |

Walsh Code Length L=4

| Ordinary Order of Walsh Code | Walsh Code |
|---|---|
| 0 | 0 0 0 0 |
| 1 | 0 1 0 1 |
| 2 | 0 0 1 1 |
| 3 | 0 1 1 0 |

B

Walsh Code Length L=4

| Paley Order of Walsh Code | Walsh Code |
|---|---|
| 0 | 0 0 0 0 |
| 2 | 0 0 1 1 |
| 1 | 0 1 0 1 |
| 3 | 0 1 1 0 |

Fig. 10
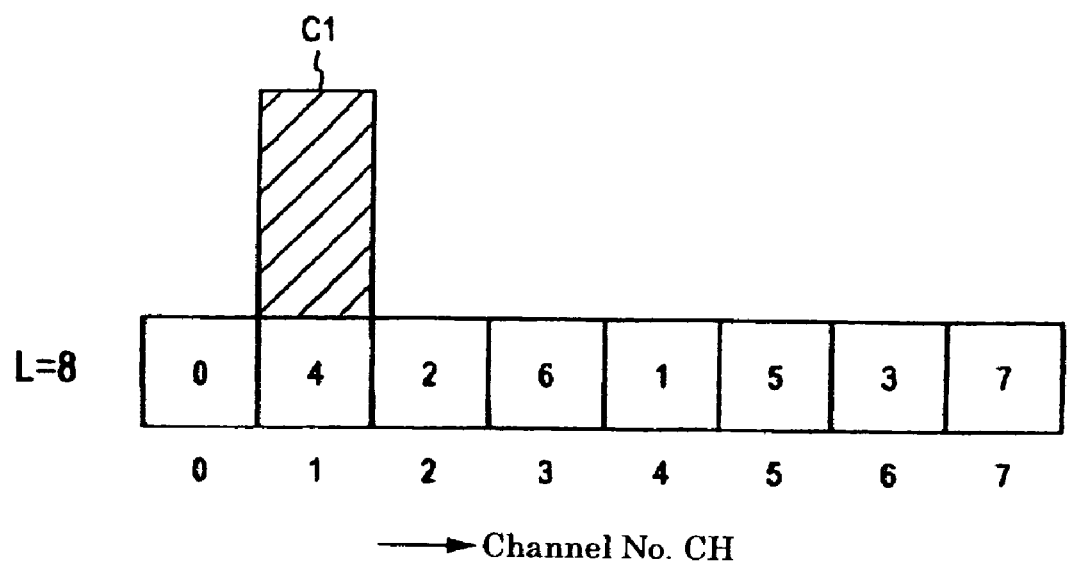
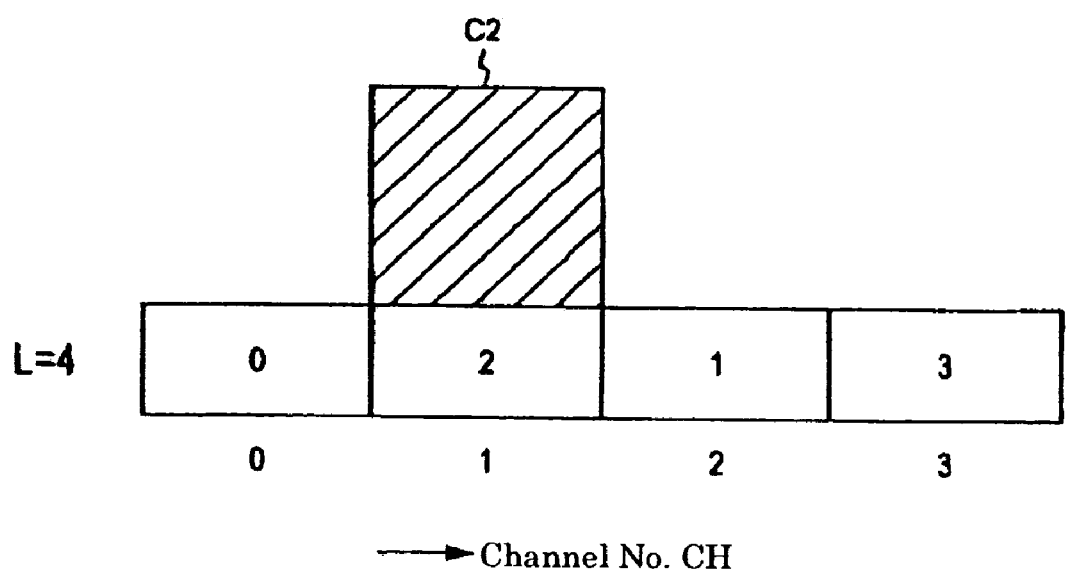

Fig. 11

| L=32 | 0 | 16 | 8 | 24 | 4 | 20 | 12 | 28 | 2 | 18 | 10 | 26 | 6 | 22 | 14 | 30 | 1 | 17 | 9 | 25 | 5 | 21 | 13 | 29 | 3 | 19 | 11 | 27 | 7 | 23 | 15 | 31 |
|---|---|---|---|---|---|---|---|---|---|---|---|---|---|---|---|---|---|---|---|---|---|---|---|---|---|---|---|---|---|---|---|---|
| L=16 | 0 | | 8 | | 4 | | 12 | | 2 | | 10 | | 6 | | 14 | | 1 | | 9 | | 5 | | 13 | | 3 | | 11 | | 7 | | 15 | |
| L=8 | 0 | | | | 4 | | | | 2 | | | | 6 | | | | 1 | | | | 5 | | | | 3 | | | | 7 | | | |
| L=4 | 0 | | | | | | | | 2 | | | | | | | | 1 | | | | | | | | 3 | | | | | | | |

→ Channel No. CH

MULTIPLEXED SIGNAL QUALITY DISPLAY SYSTEM, METHOD, AND PROGRAM, AND STORAGE MEDIUM STORING THE PROGRAM

FIELD OF ART

The present invention relates to the display of waveform quality of a multiplexed signal such as CDMA signal.

BACKGROUND ART

The applicant in the present case has previously proposed such a CDMA signal waveform quality measuring method as disclosed in Japanese Patent Laid Open No. 173628/1998. FIG. 19 shows an example of power display of various channels as measured by the measuring method disclosed therein.

In FIG. 19, electric power W is plotted along the axis of ordinate, while channels CH are plotted along the axis of abscissa. In the example of FIG. 19, Walsh code length is set at "64" to permit connection of 64-channel lines, and a state is shown in which channels 0, 1, 3, 5, 7, 9, 11, 13 . . . 61, and 63 are generating signals.

However, in measuring the waveform quality of CDMA signal while fixing Walsh code length at "64," it is impossible to check the waveform qualities at different Walsh code lengths. As to the CDMA signal presently used in portable telephone, a standard which permits Walsh code length to be switched to six lengths of 4, 8, 16, 32, 64, and 128 is now under consideration. Thus, it is inconvenient that the waveform quality at only a specific Walsh code length can be seen.

Accordingly, it is an object of the present invention to display the waveform qualities at plural Walsh code lengths.

DISCLOSURE OF THE INVENTION

The present invention as described in claim 1, is a multiplexed signal quality display system for measuring the quality of a multiplexed signal from a communication device wherein a band width to be used and the number of communication channels capable of being accommodated are determined by a diffusion code length, and channels to be used having the number of communication channels, which are determined by a diffusion code length, are decided in terms of a diffusion code number affixed to the type of the diffusion code, to effect communication while ensuring multi-channel communication lines in one and same band, the system including: a code length setting updating unit which initializes a diffusion code length and which updates values from the initialized value up to a predetermined final value; a diffusion code number setting updating unit which, each time the diffusion code length set by the code length setting updating unit is updated, updates diffusion code numbers corresponding to the number of channels determined by diffusion code lengths respectively, from an initialized value up to a predetermined final value; a diffusion code generating unit which generates a diffusion code in accordance with a diffusion code length and a diffusion code number generated respectively by the code length setting updating unit and the diffusion code number setting updating unit; a demodulator unit which demodulates the signal in each the channel in accordance with the diffusion code generated by the diffusion code generating unit and the diffusion code length and the diffusion code number; a power coefficient calculator which calculates a power coefficient of the signal demodulated by the demodulator unit; a memory which stores the power coefficient of each the channel calculated by the power coefficient calculation in accordance with the diffusion code length and the diffusion code number; a setting unit which reads a power coefficient from among the power coefficients stored in the memory while specifying desired diffusion code and diffusion code number; a graphing unit which converts the power coefficient read by the setting unit into a power value, determines a length in Y-axis direction in accordance with the power value, and defines a width in X-axis direction in accordance with the diffusion code length to form a strip-like display region; an image memory which stores image data graphed by the graphing unit; and a calculation result display unit which displays the image stored in the image memory.

According to the present invention as described in claim 2, a multiplexed signal quality display system includes: an electric power measuring unit for measuring electric powers of signals to be measured in certain specific channels to be measured; and a calculation result display unit for displaying graphs, the graphs respectively having widths corresponding to band widths which are determined by diffusion code lengths corresponding to the channels to be measured, the graphs respectively having lengths corresponding to the values of the electric powers.

The present invention as described in claim 3, is a multiplexed signal quality display system according to claim 2, wherein the graphs are rectangular in shape, having respectively the widths and the lengths as lengths of sides thereof.

The present invention as described in claim 4, is a multiplexed signal quality display system according to claim 2, wherein the graphs are triangular in shape, having respectively the lengths as heights and the widths as base lengths.

According to the present invention as described in claim 5, a multiplexed signal quality display system includes: an electric power measuring unit for measuring electric powers of signals to be measured in certain specific channels to be measured; and a calculation result display unit for displaying graphs, the graphs having widths corresponding to band widths which are determined by diffusion code lengths corresponding to the channels to be measured, the graphs being respectively arranged at heights corresponding to the values of the electric powers.

The present invention as described in claim 6, is a multiplexed signal quality display system according to claim 5, wherein the graphs are rectangular in shape, having predetermined heights.

The present invention as described in claim 7, is a multiplexed signal quality display system according to claim 6, wherein the graphs are arranged in a vertical direction at predetermined intervals.

The present invention as described in claim 8, is a multiplexed signal quality display system according to claim 5, wherein the graphs are square in shape.

According to the present invention as described in claim 9, a multiplexed signal quality display system includes: an electric power measuring unit for measuring electric powers of signals to be measured in certain specific channels to be measured; and a calculation result display unit which displays graphs together in a width direction for each diffusion code lengths corresponding to the channels to be measured, the graphs respectively having lengths proportional to the values of the electric powers and having a common width, wherein the calculation result display unit takes the spacing between the graphs related to different diffusion code lengths wider than that between the graphs related to the same diffusion code length.

According to the present invention as described in claim 10, a multiplexed signal quality display system includes: an electric power measuring unit for measuring electric powers of signals to be measured in certain specific channels to be measured; and a calculation result display unit for displaying sectorial graphs, the sectorial graphs having angles corresponding to band widths which are determined by diffusion code lengths corresponding to the channels to be measured, the sectorial graphs having radius proportional to the values of the electric powers.

According to the present invention as described in claim 11, a multiplexed signal quality display system includes: an electric power measuring unit for measuring electric powers of signals to be measured in certain specific channels to be measured; and a calculation result display unit which displays display dots at distances proportional to the values of the electric powers from a predetermined central point in such a manner that from one the display dot is spaced another the display dot at a position having rotated by a predetermined angle from the one display dot, the angle corresponding to a band width which is determined by a diffusion code length corresponding to the channels to be measured.

The present invention as described in claim 12, is a multiplexed signal quality display system according to any of claims 2 to 10, wherein the graphs have different colors for each the diffusion code lengths.

The present invention as described in claim 13, is a multiplexed signal quality display system according to claim 11, wherein the display dots have different colors for each the diffusion code lengths.

The present invention as described in claim 14, is a multiplexed signal quality display system according to any of claims 2 to 8, wherein the calculation result display unit displays the graphs while arranging the graphs in the width direction in Paley order.

According to the present invention as described in claim 15, a multiplexed signal quality display method includes: an electric power measuring step for measuring electric powers of signals to be measured in certain specific channels to be measured; and a calculation result display step for displaying graphs, the graphs respectively having widths corresponding to band widths which are determined by diffusion code lengths corresponding to the channels to be measured, the graphs respectively having lengths corresponding to the values of the electric powers.

According to the present invention as described in claim 16, is a multiplexed signal quality display method includes: an electric power measuring step for measuring electric powers of signals to be measured in certain specific channels to be measured; and a calculation result display step for displaying graphs, the graphs having widths corresponding to band widths which are determined by diffusion code lengths corresponding to the channels to be measured, the graphs being respectively arranged at heights corresponding to the values of the electric powers.

According to the present invention as described in claim 17, a multiplexed signal quality display method includes: an electric power measuring step for measuring electric powers of signals to be measured in certain specific channels to be measured; and a calculation result display step which displays graphs together in a width direction for each diffusion code lengths corresponding to the channels to be measured, the graphs respectively having lengths proportional to the values of the electric powers and having a common width, wherein the calculation result display step takes the spacing between the graphs related to different diffusion code lengths wider than that between the graphs related to the same diffusion code length.

According to the present invention as described in claim 18, a multiplexed signal quality display method includes: an electric power measuring step for measuring electric powers of signals to be measured in certain specific channels to be measured; and a calculation result display step for displaying sectorial graphs, the sectorial graphs having angles corresponding to band widths which are determined by diffusion code lengths corresponding to the channels to be measured, the sectorial graphs having radius proportional to the values of the electric powers.

According to the present invention as described in claim 19, a multiplexed signal quality display method includes: an electric power measuring step for measuring electric powers of signals to be measured in certain specific channels to be measured; and a calculation result display step which displays display dots at distances proportional to the values of the electric powers from a predetermined central point in such a manner that from one the display dot is spaced another the display dot at a position having rotated by a predetermined angle from the one display dot, the angle corresponding to a band width which is determined by a diffusion code length corresponding to the channels to be measured.

The present invention as described in claim 20, is a program of instructions for execution by the computer to perform a multiplexed signal quality display processing, the multiplexed signal quality display processing including: an electric power measuring process for measuring electric powers of signals to be measured in certain specific channels to be measured; and a calculation result display process for displaying graphs, the graphs respectively having widths corresponding to band widths which are determined by diffusion code lengths corresponding to the channels to be measured, the graphs respectively having lengths corresponding to the values of the electric powers.

The present invention as described in claim 21 is a program of instructions for execution by the computer to perform a multiplexed signal quality display processing, the multiplexed signal quality display processing including: an electric power measuring process for measuring electric powers of signals to be measured in certain specific channels to be measured; and a calculation result display process for displaying graphs, the graphs having widths corresponding to band widths which are determined by diffusion code lengths corresponding to the channels to be measured, the graphs being respectively arranged at heights corresponding to the values of the electric powers.

The present invention as described in claim 22 is a program of instructions for execution by the computer to perform a multiplexed signal quality display processing, the multiplexed signal quality display processing including: an electric power measuring process for measuring electric powers of signals to be measured in certain specific channels to be measured; and a calculation result display process which displays graphs together in a width direction for each diffusion code lengths corresponding to the channels to be measured, the graphs respectively having lengths proportional to the values of the electric powers and having a common width, wherein the calculation result display process takes the spacing between the graphs related to different diffusion code lengths wider than that between the graphs related to the same diffusion code length.

The present invention as described in claim 23 is a program of instructions for execution by the computer to perform a multiplexed signal quality display processing, the multiplexed signal quality display processing including: an electric power measuring process for measuring electric powers of signals to be measured in certain specific channels to be measured; and a calculation result display process for displaying sectorial graphs, the sectorial graphs having angles corresponding to band widths which are determined by diffusion code lengths corresponding to the channels to be measured, the sectorial graphs having radius proportional to the values of the electric powers.

The present invention as described in claim 24 is a program of instructions for execution by the computer to perform a multiplexed signal quality display processing, the multiplexed signal quality display processing including: an electric power measuring process for measuring electric powers of signals to be measured in certain specific channels to be measured; and a calculation result display process which displays display dots at distances proportional to the values of the electric powers from a predetermined central point in such a manner that from one the display dot is spaced another the display dot at a position having rotated by a predetermined angle from the one display dot, the angle corresponding to a band width which is determined by a diffusion code length corresponding to the channels to be measured.

The present invention as described in claim 25, is a computer-readable medium having a program of instructions for execution by the computer to perform a multiplexed signal quality display processing, the multiplexed signal quality display processing including: an electric power measuring process for measuring electric powers of signals to be measured in certain specific channels to be measured; and a calculation result display process for displaying graphs, the graphs respectively having widths corresponding to band widths which are determined by diffusion code lengths corresponding to the channels to be measured, the graphs respectively having lengths corresponding to the values of the electric powers.

The present invention as described in claim 26, is a computer-readable medium having a program of instructions for execution by the computer to perform a multiplexed signal quality display processing, the multiplexed signal quality display processing including: an electric power measuring process for measuring electric powers of signals to be measured in certain specific channels to be measured; and a calculation result display process for displaying graphs, the graphs having widths corresponding to band widths which are determined by diffusion code lengths corresponding to the channels to be measured, the graphs being respectively arranged at heights corresponding to the values of the electric powers.

The present invention as described in claim 27, is a computer-readable medium having a program of instructions for execution by the computer to perform a multiplexed signal quality display processing, the multiplexed signal quality display processing including: an electric power measuring process for measuring electric powers of signals to be measured in certain specific channels to be measured; and a calculation result display process which displays graphs together in a width direction for each diffusion code lengths corresponding to the channels to be measured, the graphs respectively having lengths proportional to the values of the electric powers and having a common width, wherein the calculation result display process takes the spacing between the graphs related to different diffusion code lengths wider than that between the graphs related to the same diffusion code length.

The present invention as described in claim 28, is a computer-readable medium having a program of instructions for execution by the computer to perform a multiplexed signal quality display processing, the multiplexed signal quality display processing including: an electric power measuring process for measuring electric powers of signals to be measured in certain specific channels to be measured; and a calculation result display process for displaying sectorial graphs, the sectorial graphs having angles corresponding to band widths which are determined by diffusion code lengths corresponding to the channels to be measured, the sectorial graphs having radius proportional to the values of the electric powers.

The present invention as described in claim 29, is a computer-readable medium having a program of instructions for execution by the computer to perform a multiplexed signal quality display processing, the multiplexed signal quality display processing including: an electric power measuring process for measuring electric powers of signals to be measured in certain specific channels to be measured; and a calculation result display process which displays display dots at distances proportional to the values of the electric powers from a predetermined central point in such a manner that from one the display dot is spaced another the display dot at a position having rotated by a predetermined angle from the one display dot, the angle corresponding to a band width which is determined by a diffusion code length corresponding to the channels to be measured.

The present invention as described in claim 30, is a multiplexed signal quality display method for measuring the quality of a multiplexed signal from a communication device wherein a band width to be used and the number of communication channels capable of being accommodated are determined by a diffusion code length, and channels to be used having the number of communication channels, which are determined by a diffusion code length, are decided in terms of a diffusion code number affixed to the type of the diffusion code, to effect communication while ensuring multi-channel communication lines in one and same band, the method including: a code length setting updating step which initializes a diffusion code length and which updates values from the initialized value up to a predetermined final value; a diffusion code number setting updating step which, each time the diffusion code length set by the code length setting updating step is updated, updates diffusion code numbers corresponding to the number of channels determined by diffusion code lengths respectively, from an initialized value up to a predetermined final value; a diffusion code generating step which generates a diffusion code in accordance with a diffusion code length and a diffusion code number generated respectively by the code length setting updating step and the diffusion code number setting updating step; a demodulation step which demodulates the signal in each the channel in accordance with the diffusion code generated by the diffusion code generating step and the diffusion code length and the diffusion code number; a power coefficient calculation step which calculates a power coefficient of the signal demodulated by the demodulation step; a storing step which stores the power coefficient of each the channel calculated by the power coefficient calculation in accordance with the diffusion code length and the diffusion code number; a setting step which reads a power coefficient from among the power coefficients stored in the storing step while specifying desired diffusion code and diffusion code number; a graphing step which converts the power coefficient read by the setting step into a power value, determines a length in Y-axis direction in accordance with the power value, and defines a width in X-axis direction in accordance with the diffusion code length to form a strip-like display region; an image storing step which stores image data graphed by the graphing step; and a calculation result display step which displays the image stored in the image storing step.

According to the present invention as described in claim 31, is a program of instructions for execution by the computer to perform a multiplexed signal quality display processing, for measuring the quality of a multiplexed signal from a communication device wherein a band width to be used and the number of communication channels capable of being accommodated are determined by a diffusion code length, and channels to be used having the number of communication channels, which are determined by a diffusion code length, are decided in terms of a diffusion code number affixed to the type of the diffusion code, to effect communication while ensuring multi-channel communication lines in one and same band, the multiplexed signal quality display processing including: a code length setting updating process which initializes a diffusion code length and which updates values from the initialized value up to a predetermined final value; a diffusion code number setting updating process which, each time the diffusion code length set by the code length setting updating process is updated, updates diffusion code numbers corresponding to the number of channels determined by diffusion code lengths respectively, from an initialized value up to a predetermined final value; a diffusion code generating process which generates a diffusion code in accordance with a diffusion code length and a diffusion code number generated respectively by the code length setting updating process and the diffusion code number setting updating process; a demodulation process which demodulates the signal in each the channel in accordance with the diffusion code generated by the diffusion code generating process and the diffusion code length and the diffusion code number; a power coefficient calculation process which calculates a power coefficient of the signal demodulated by the demodulation process; a storing process which stores the power coefficient of each the channel calculated by the power coefficient calculation in accordance with the diffusion code length and the diffusion code number; a setting process which reads a power coefficient from among the power coefficients stored in the storing process while specifying desired diffusion code and diffusion code number; a graphing process which converts the power coefficient read by the setting process into a power value, determines a length in Y-axis direction in accordance with the power value, and defines a width in X-axis direction in accordance with the diffusion code length to form a strip-like display region; an image storing process which stores image data graphed by the graphing process; and a calculation result display process which displays the image stored in the image storing process.

The present invention as described in claim 32, a computer-readable medium having a program of instructions for execution by the computer to perform a multiplexed signal quality display processing, for measuring the quality of a multiplexed signal from a communication device wherein a band width to be used and the number of communication channels capable of being accommodated are determined by a diffusion code length, and channels to be used having the number of communication channels, which are determined by a diffusion code length, are decided in terms of a diffusion code number affixed to the type of the diffusion code, to effect communication while ensuring multi-channel communication lines in one and same band, the multiplexed signal quality display processing including: a code length setting updating process which initializes a diffusion code length and which updates values from the initialized value up to a predetermined final value; a diffusion code number setting updating process which, each time the diffusion code length set by the code length setting updating process is updated, updates diffusion code numbers corresponding to the number of channels determined by diffusion code lengths respectively, from an initialized value up to a predetermined final value; a diffusion code generating process which generates a diffusion code in accordance with a diffusion code length and a diffusion code number generated respectively by the code length setting updating process and the diffusion code number setting updating process; a demodulation process which demodulates the signal in each the channel in accordance with the diffusion code generated by the diffusion code generating process and the diffusion code length and the diffusion code number; a power coefficient calculation process which calculates a power coefficient of the signal demodulated by the demodulation process; a storing process which stores the power coefficient of each the channel calculated by the power coefficient calculation in accordance with the diffusion code length and the diffusion code number; a setting process which reads a power coefficient from among the power coefficients stored in the storing process while specifying desired diffusion code and diffusion code number; a graphing process which converts the power coefficient read by the setting process into a power value, determines a length in Y-axis direction in accordance with the power value, and defines a width in X-axis direction in accordance with the diffusion code length to form a strip-like display region; an image storing process which stores image data graphed by the graphing process; and a calculation result display process which displays the image stored in the image storing process.

According to the present invention, a strip-like display region for displaying electric powers of various signals is given a width in X-axis direction corresponding to a band width which is determined by Walsh code length. Therefore, in the case where electric powers of signals in channels different in Walsh code length are displayed on the one and same screen, since the display region of each channel is displayed at a width corresponding to the associated Walsh code length, a mere look at the displayed width can determine which Walsh code length the signal concerned has.

According to the present invention, moreover, since different colors are used for each channel display region, for example even if display portions B1 and B2 are present adjacent each other as shown in FIG. 6, distinction is made in terms of colors and so there accrues an advantage that it becomes easier to make distinction.

Further, according to the present invention, since channel numbers are changed in terms of Paley order and display positions of channels are determined in accordance with the Paley order, there never occurs an overlapped state of channel displays.

Therefore, according to the display method of the present invention, attributes of multiplexed multi-channel signals can be displayed in a distinguished manner and hence it is possible to provide a measuring system convenient for use.

BRIEF DESCRIPTION OF THE DRAWINGS

FIG. 2 is a diagram showing an arithmetic expression;

FIG. 4 is a diagram showing an ordinary order (FIG. 4A) and Paley order (FIG. 4B) at Walsh code length L=8;

FIG. 5 is a diagram showing an ordinary order (FIG. 5A) and Paley order (FIG. 5B) at Walsh code length L=4;

FIG. 10 is a diagram showing a state in which display regions no longer overlap each other;

FIG. 11 is a diagram showing a re-arranged state of diffusion code numbers in diffusion code length L0 in Paley order;

BEST MODE FOR CARRYING OUT THE INVENTION

Embodiments of the present invention will be described hereinunder with reference to the accompanying drawings.

First Embodiment

Figure 1:
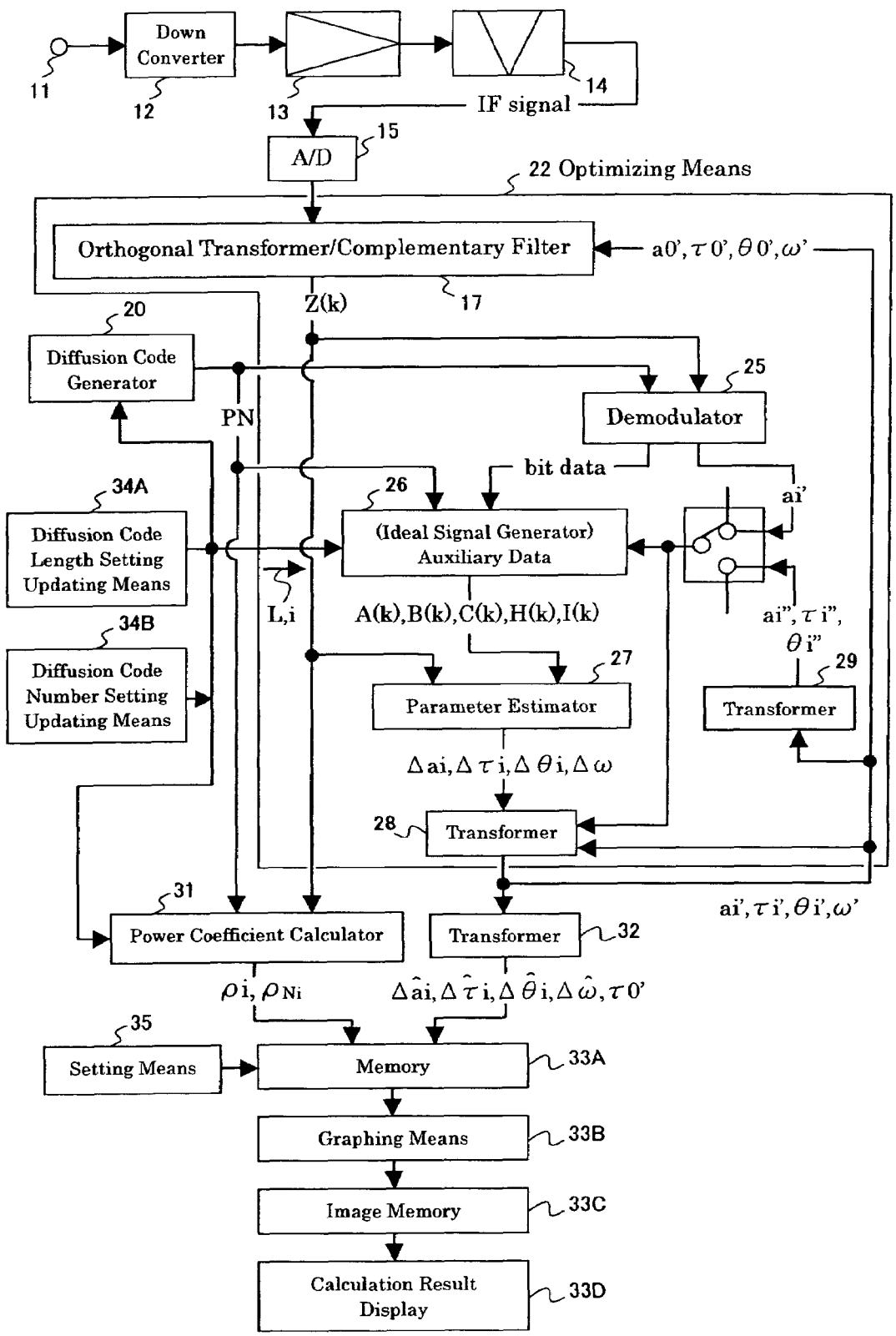
FIG. 1 is a diagram showing the construction of a multiplexed signal waveform quality measuring system according to a first embodiment of the present invention.

FIG. 1 shows an example of a multiplexed signal waveform quality measuring system according to a first embodiment of the present invention.

In FIG. 1, a frequency-diffused, multi-channel CDMA signal from a base station is inputted through an input terminal 11 and is converted to an intermediate frequency signal by means of a down converter 12. The intermediate frequency signal is amplified by an amplifier 13, then is band-limited by a filter 14, and is thereafter converted to a digital signal by an A/D converter 15. The digital intermediate frequency signal from the A/D converter 15 is converted to a base band signal by an orthogonal transformer 17 which includes a complementary filter, affording a base band measurement signal Z(k).

The base band measurement signal Z(k) is inverse-diffused in a demodulator 25 with a diffusion code (Walsh code) provided from a diffusion code generator 20 and bit data is demodulated for each channel. At the same time, amplitude a'i (i is channel number) of each channel is detected.

In an ideal signal generator 26, an ideal signal Ri (i is channel number) is produced on the basis of both bit data provided from the demodulator 25 and diffusion code PN (Walsh code) provided from the diffusion code generator 20. Further, in accordance with the ideal signal Ri, the following expressions are calculated to generate correction data Ai(k), Bi(k), Ci(k), Ii(k), and Hi(k):

$$A_i(k) = a'_i \cdot \left[ \sum_{m=-M}^{M} a(m) \cdot R_i(k-m) \right] \cdot e^{j\theta'_i} \quad (1)$$

$$B_i(k) = \left\{ \begin{array}{l} 2a'_i \cdot \left[ \sum_{m=-M}^{M} a(m) \cdot R_i(k-m) \right] \cdot \tau'_i + \\ a'_i \cdot \left[ \sum_{m=-M}^{M} b(m) \cdot R_i(k-m) \right] \end{array} \right\} \cdot e^{j\theta'_i} \quad (2)$$

$$C_i(k) = \left\{ \begin{array}{l} a'_i \cdot \left[ \sum_{m=-M}^{M} a(m) \cdot R_i(k-m) \right] \cdot \tau'^2_i + \\ a'_i \cdot \left[ \sum_{m=-M}^{M} b(m) \cdot R_i(k-m) \right] \cdot \tau'_i + \\ a'_i \cdot \left[ \sum_{m=-M}^{M} c(m) \cdot R_i(k-m) \right] \end{array} \right\} \cdot e^{j\theta'_i} \quad (3)$$

$$I_i(k) = \left\{ \begin{array}{l} \left[ \sum_{m=-M}^{M} a(m) \cdot R_i(k-m) \right] \cdot \tau'^2_i + \\ \left[ \sum_{m=-M}^{M} b(m) \cdot R_i(k-m) \right] \cdot \tau'_i + \\ \left[ \sum_{m=-M}^{M} c(m) \cdot R_i(k-m) \right] \end{array} \right\} \cdot e^{j\theta'_i} \quad (4)$$

$$H_i(k) = \left\{ \begin{array}{l} 2 \cdot \left[ \sum_{m=-M}^{M} a(m) \cdot R_i(k-m) \right] \cdot \tau'_i + \\ \left[ \sum_{m=-M}^{M} b(m) \cdot R_i(k-m) \right] \end{array} \right\} \cdot e^{j\theta'_i} \quad (5)$$

The ideal signal Ri is obtained in the following manner. Demodulated bit data of each channel i provided from the demodulator 25 are inverse-diffused with I- and Q-side diffusion codes (Walsh codes) provided from the diffusion code generator 20, then chips "0" and "1" in the thus inverse-diffused I- and Q-side chip rows are converted to + $\sqrt{2}$ and $-\sqrt{2}$, respectively to afford I and Q signals of QPSK signal with an amplitude of 1. That is, using the ideal signal Ri(k-m) with a normalized amplitude and the amplitude a'i from the demodulator 25, there are calculated auxiliary data Ai(k), Bi(k), Ci(k), Ii(k), and Hi(k).

The auxiliary data Ai(k), Bi(k), Ci(k), Ii(k), and Hi(k) and the measurement signal Z(k) are inputted to a parameter estimator 27, in which simultaneous equations shown in FIG. 2 are solved and estimate values Δai, Δτi, Δθi, and Δω are obtained as solutions thereof. Using these estimate values, the correction parameters so far used a'i, τ'i, θ'i, and ω' are updated as follows in a transformer 28:

$$\omega' \leftarrow \omega' + \Delta\omega \; a'i \leftarrow a'i + \Delta ai \; \tau'i \leftarrow \tau'i + \Delta\tau i \; \theta'i \leftarrow \theta'i + \Delta\theta i \quad (6)$$

Then, using the thus-corrected parameters a'i, τ'i, θ'i, and ω', correction is made for the measurement signal Z(k) and the thus-corrected measurement signal Z(k) is again subjected to the processings in the demodulator 25, the ideal signal/auxiliary data generator 26, the parameter estimator 27, and the transformer 28. These processings are carried out until the estimate values Δai, Δτi, Δθi, and Δω are optimized, that is, until reaching zero or near zero, or until there occurs no change of value ever with repetition. By this optimizing step, correction is made not only for the measurement signal Z(k) but also for the ideal signal Ri.

Therefore, an optimizing means 22 is constituted by the orthogonal transformer 17 which includes a complementary filter, the demodulator 25, the ideal signal generator 26, the parameter estimator 27, and the transformers 28 and 29.

Correction for the measurement signal Z(k) is made as follows relative to Z(k) of the last time:

$$Z(k) \leftarrow Z(t-\tau'0)(1/a'0) \exp[-j(\omega'(t-\tau'0)+\theta'0)] \quad (7)$$

As initial values are set a'0=1, τ'0=0, θ'0=0, and ω'=0, and each time estimate values are obtained in the parameter estimator 27, the expression (7) is calculated with respect to new a'i, τ'i, θ'i, and ω'. That is, this calculation for correction is made for the signal inputted to the orthogonal transformer/complementary filter 17, i.e., the output of the A/D converter 15.

The calculation for correction may be performed for the measurement signal Z(k) after conversion to the base band. However, this base band-converted signal is a signal after having passed the complementary filer (the same pass band width as the band width of the input signal). If there is a gross frequency error, this filter processing may result in that a portion of the signal is removed, that is, the measurement signal to be used in parameter estimation, etc., is chipped. Therefore, the result of the frequency estimation is corrected at a stage which precedes the complementary filter. But the correction may be made for the measurement signal after conversion to the base band, provided there is used a low pass filter of a sufficiently wide band without using the complementary filter in the orthogonal transformer/complementary filter 17.

The correction parameters a'i, τ'i, and θ'i are subjected to the following conversion in the transformer 29:

$$a''i=a'i/a'0 \quad \tau''i=\tau'i-\tau'0 \quad \theta''i=\theta'i-\theta'0 \text{ provided } i \neq 0 \quad (8)$$

As to the measurement signal Z(k), since the parameters of the $0^{th}$ channel are corrected by the expression (7), the parameters for normalizing the $0^{th}$ ideal signal $R_0$ are normalized into the following values:

a"0=1
τ"0=0
θ"0=0

The parameters for the ideal signal Ri of channels other than the $0^{th}$ channel are corrected by $0^{th}$ parameters as in the expression (8).

That is, in the first repetition in the foregoing optimization step, correction for the measurement signal Z(k) is made using the correction parameters of the $0^{th}$ channel and therefore, as correction parameters used in the auxiliary data generator 26, there is used the expression (8) normalized by the parameters of the $0^{th}$ channel, i.e., a transformed output of the transformer 29. More particularly, the calculations of the expressions (1) to (5) are performed using parameters which are conceivable in the expression (8) to determine auxiliary data Ai(k), Bi(k), Ci(k), Ii(k), and Hi(k). In these calculations for determining auxiliary data there are used bit data and amplitude a'i, the bit data being obtained as a result of demodulating Z(k) in the demodulator 25 after correction by the expression (7).

Thus, both corrections described above are performed every time estimate values are obtained from the parameter estimator 27, and the estimation of parameters is again repeated until optimization of the estimate values, whereupon a power coefficient ρi is calculated and determined as follows in a power coefficient calculator 31, using measurement signal Z(k) and diffusion code (Walsh code) obtained at that instant:

$$\rho_i = \frac{\sum_{j=1}^{N} \left| \sum_{k=1}^{64} Z_{j,k} R^*_{i,j,k} \right|^2}{\left\{ \sum_{k=1}^{64} |R_{i,j,k}|^2 \right\} \left\{ \sum_{j=1}^{N} \sum_{k=1}^{64} |Z_{j,k}|^2 \right\}} \quad (9)$$

The expression (9) is the same as the expression defined by the CDMA signal measurement standard and used in the prior art.

The following calculation is performed in a transformer 32:

$$a^\wedge = a'\Delta\tau\hat{i}=\tau'i-\tau'0 \quad \Delta\theta^\wedge i=\theta'i-\theta'0 \quad \Delta\omega^\wedge=\omega' \quad (10)$$

The parameters a^, Δτ^i, Δθ^i, Δω^, τ^0, and the power coefficient ρi obtained in the power coefficient calculator 31 are displayed on a calculation result display 33.

As described above, according to the invention proposed previously, the measurement signal Z(k) and the ideal signal Ri are corrected using estimated parameters, and the estimation of parameters is again performed using both corrected signals until optimization of the estimated parameters. Since all the parameters are used in this optimization, all the parameters are optimized, and after the optimization, the power coefficient ρi is determined using the measurement signal, so that the power coefficient ρi can be obtained with a high accuracy. Other parameters are also determined with a high accuracy because the measurement signal is included in the optimization loop.

Figure 3:
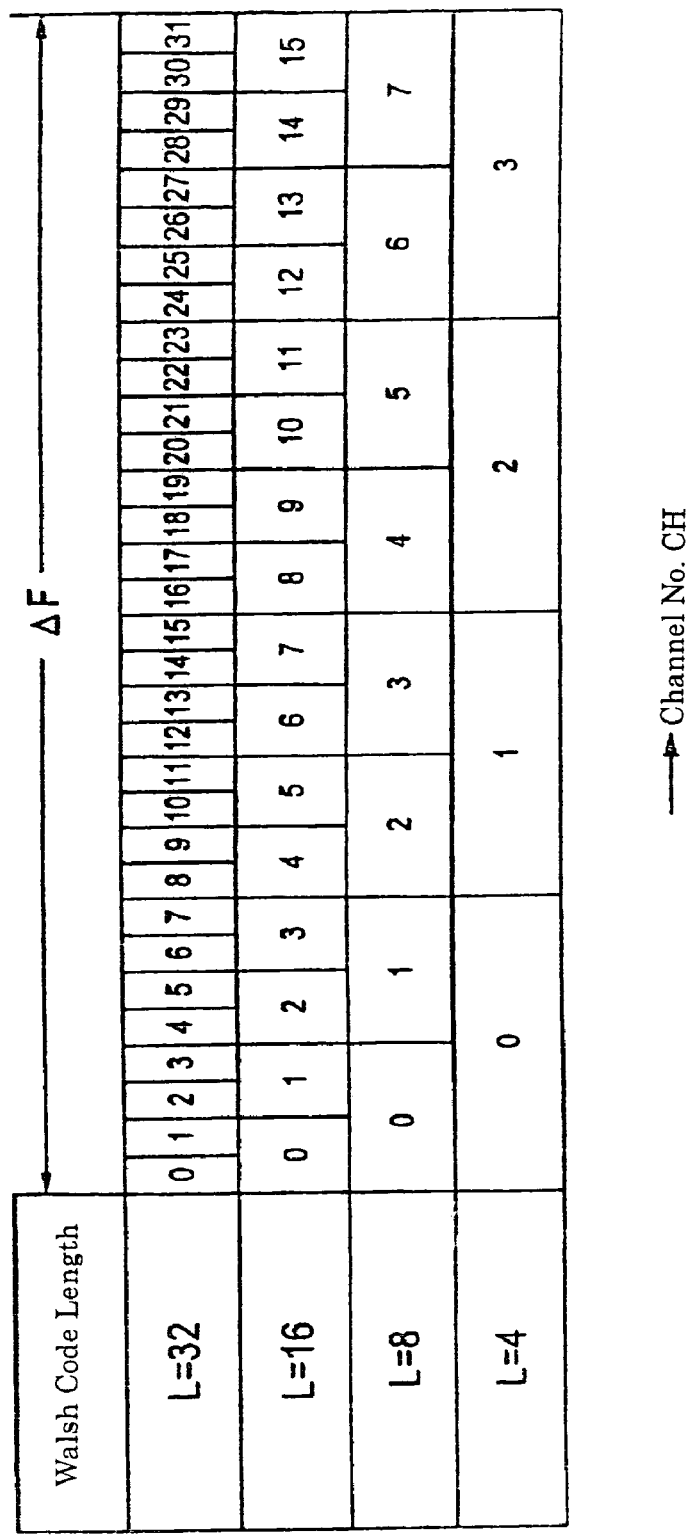
FIG. 3 is a diagram showing a relation between Walsh code length and Walsh code.

In the prior art it is only proposed to fix Walsh code length at "64" and measure the waveform quality of CDMA signal. As to CDMA signal presently used in portable telephone, a standard which permits Walsh code length to be switched to six lengths of 4, 8, 16, 32, 64, and 128 is now under consideration. A brief description will here be given about Walsh code length as a diffusion code length and Walsh code as a diffusion code having the number of bits determined by Walsh code length. A band width of a transmission line is set by Walsh code length and a channel number is determined by Walsh code. FIG. 3 shows a relation between Walsh code length and Walsh code. L=4, L=8, L=16, . . . shown in the left column represent Walsh code lengths. At Walsh code length L=4, a predetermined band width ΔF is divided in four and four channels of 0, 1, 2, and 3 are allocated thereto. The channel numbers 0, 1, 2, and 3 of the four channels are given in terms of Walsh code numbers 0, 1, 2, and 3. As is seen from FIG. 3, as Walsh code length becomes larger, the number of employable channels increases in a doubly increasing relation and an employable band width becomes narrower in decrements of ½. From this relation it will be seen that a short Walsh code length is allocated to a telephone set which handles a large volume of data to be transmitted, while a long Walsh code length is allocated to a telephone set which handles a small volume of data. In FIG. 3 Walsh code lengths 64 and 128 are omitted.

The numbers 0-3, 0-7, 0-15, and 0-31 shown in the table of FIG. 3 represent code numbers (corresponding also to channel numbers) assigned to diffusion codes (Walsh codes) respectively. A description will now be given about a method for selecting Walsh code length and Walsh code in a base station for portable telephone. It is not allowable to freely set and use the Walsh code lengths and Walsh codes shown in FIG. 3. A limitation is made to the effect that as to only a combination in which Walsh codes involved therein satisfy a predetermined condition, the codes may be selected and used simultaneously.

The condition is such that selected diffusion codes (Walsh codes) should satisfy the relation of mutually intersecting perpendicularly. That the codes intersect each other perpendicularly means that when bits in the same arrangements of codes are added, the sum becomes zero.

Concrete examples thereof will be given below. In case of codes being binary, bit logics 0 and 1 of the codes are replaced with +1 and −1, respectively, then the bits in the same arrangements of codes are multiplied and all the bits of code length are added, and if the sum becomes zero, this state is designated "intersect perpendicularly."

As an example, reference is made to code numbers 3 and 4 at Walsh code length L=8. FIG. 4A shows Walsh codes at Walsh code length L=8.

Walsh code of code No. 3 is 01100110.

Walsh code of code No. 4 is 00001111.

Logics 0 and 1 of each code are replaced with +1 and −1, respectively.

Walsh code of code No. 3 becomes as follows:

+1, −1, −1, +1, +1, −1, −1, +1

Walsh code of code No. 4 becomes as follows:

+1, +1, +1, +1, −1, −1, −1, −1

If the bits in the same arrangements are multiplied, the result is as follows:

+1, −1, −1, +1, −1, +1, +1, −1

An added value of all the bits becomes zero.

Thus, this combination is in a relation of "intersect perpendicularly" and thus may be selected.

Next, reference will be made below to the relation between code No. 2 of Walsh length L=4 and code No. 4 of Walsh length L=8.

As shown in FIG. 5A, Walsh code of code No. 2 at Walsh length L=4 is as follows:

0011

As shown in FIG. 4A, Walsh code of code No. 4 at Walsh code length L=8 is as follows:

00001111

Since the code length L differs, two codes of Walsh length L=4 are arranged to make the code length uniform.

Walsh code 00110011 becomes as follows:

+1, +1, −1, −1, +1, +1, −1, −1

Walsh code 00001111 of code No. 8 at L=8 becomes as follows:

+1, +1, +1, +1, −1, −1, −1, −1

If same bits are multiplied by one another, the result is:

+1, +1, −1, −1, −1, −1, +1, +1

An added value of all the bits becomes zero, showing that also in this case both codes are in a relation of intersect perpendicularly, thus permitting the selection thereof.

Next, reference will be made below to the relation between code No. 0 at Walsh code length L=4 and code No. 4 at Walsh code length L=8.

As shown in FIG. 5A, Walsh code of code No. 0 at L=4 is as follows:

0000

As shown in FIG. 4A, Walsh code of code No. 4 at L=8 is as follows:

00001111

If Walsh code of code No. 0 at L=4 is written as:

00000000 there is obtained:

+1, +1, +1, +1, +1, +1, +1, +1

Code No. 4 at L=8 becomes:

+1, +1, +1, +1, −1, −1, −1, −1

Multiplication results in:

+1, +1, +1, +1, −1, −1, −1, −1

Addition gives zero, thus showing that also in this case both codes may be selected.

Next, reference will be made below to code No. 1 at Walsh code length L=4 and code No. 1 at Walsh code length L=8.

As shown in FIG. 5A, Walsh code of code No. 1 at L=4 is as follows:

0101

Therefore, the same code is added thereto to give:

01010101

As shown in FIG. 4A, Walsh code of code No. 1 at L=8 is as follows:

01010101

If these codes are expressed in terms of numerical values, each becomes as follows:

+1, +1, +1, +1, +1, +1, +1, +1=8

It follows that this combination is in a relation of "not intersecting perpendicularly."

If an attempt is made to use simultaneously the codes which are not in the perpendicularly intersecting relation, a noise will be generated, which exerts a bad influence not only on this-side communication but also on communication in other channels. For this reason, a judgment function is incorporated in the base station so as not to select a combination of codes that do not intersect perpendicularly.

A multiplexed signal waveform quality measuring system for measuring the quality of a multiplexed signal which a base station of portable telephone issues is required to possess, as one of measurement items, a function of measuring electric power of a multiplexed channel signal and displaying it on a display.

According to the waveform quality measuring method proposed previously, Walsh code length L is fixed at L=64 and a power coefficient $\rho i$ of a 64-channel signal multiplexed at Walsh code length L=64 is measured.

As noted earlier, however, in the portable telephone sets available actually, it is required to measure and display electric powers of signals in all the channels corresponding to Walsh code lengths of 4, 8, 16, 32, 64, and 128.

To meet this requirement, if there is adopted a construction wherein all the channels at all the Walsh code lengths can be demodulated and wherein no matter which channel signal may be outputted, it is possible to measure the electric power of that signal, there arise the following inconveniences.

Figure 6:
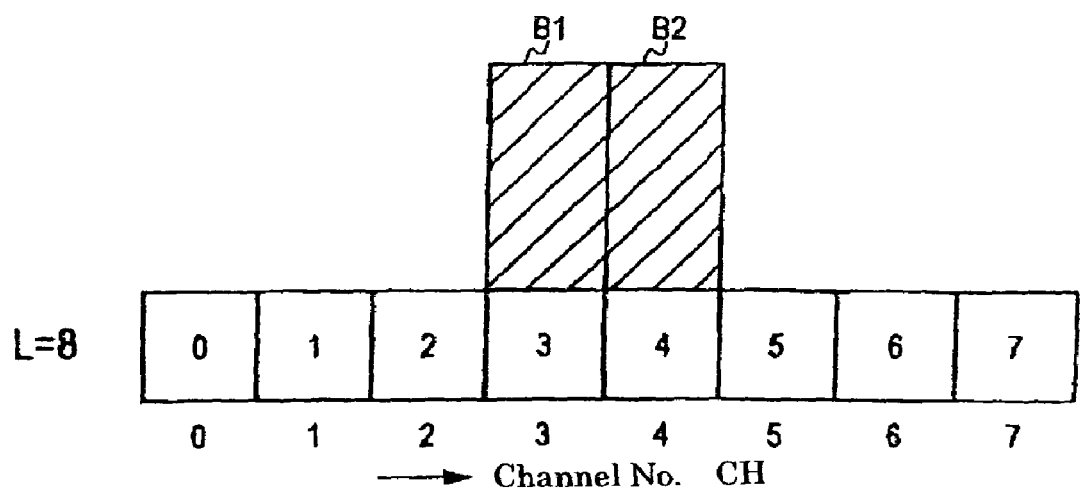
FIG. 6 is a diagram for explaining an inconvenience in a virtual comparative example.

That is, for example if code Nos. 3 and 4 at Walsh code length L=8 are selected (this combination is normal) and if a measurement result thereof is displayed on a display, a display is made in a contacted state of both display regions B1 and B2 because the channel numbers are adjacent each other, as shown in FIG. 6.

As a result, there arises an inconvenience that it is impossible to judge whether the electric power display is of one channel or of two channels.

Figure 7:
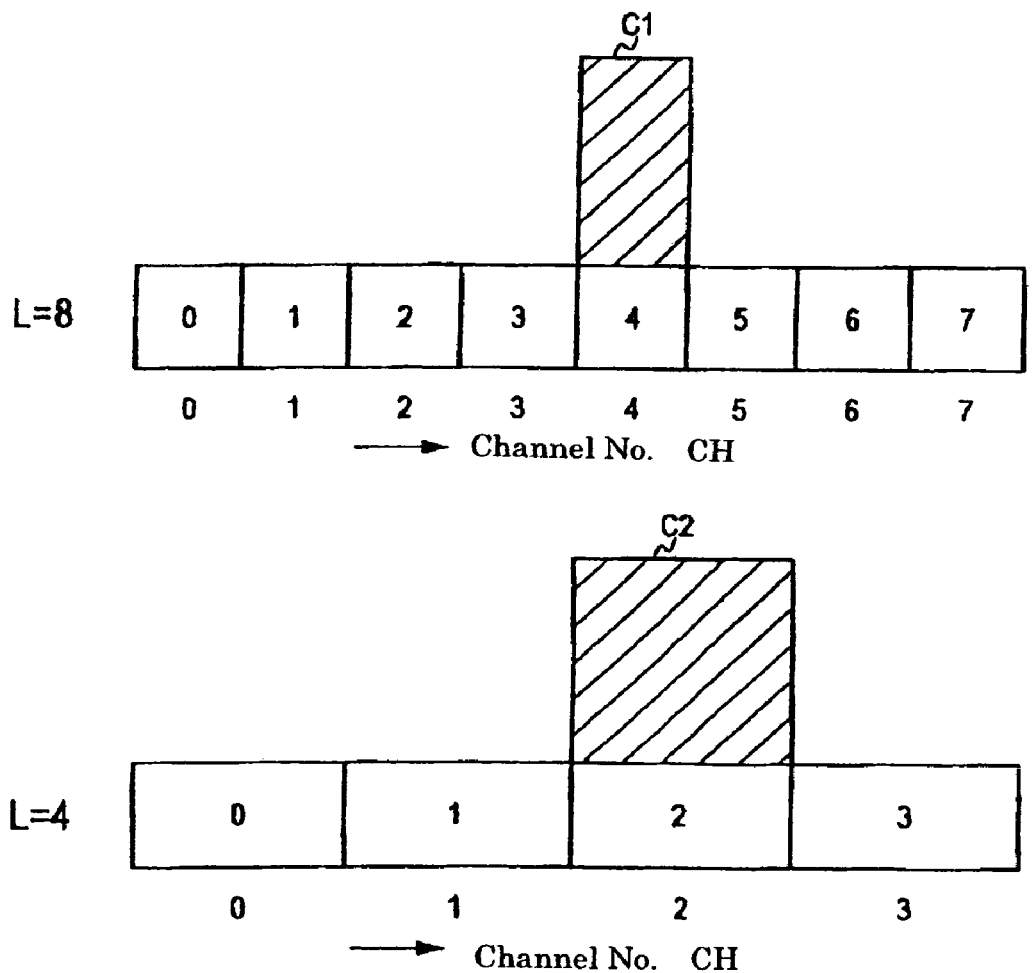
FIG. 7 is a diagram for explaining an inconvenience in a virtual comparative example.

As another example, if there are displayed electric powers of signals in a combination of code No. 2 at Walsh code length L=4 and code No. 4 at Walsh code length L=8 (this combination is also normal), as shown in FIG. 7, display regions C1 and C2 which display the electric powers overlap each other on the display. In this case, the power display of code No. 4 at Walsh code length L=8 is included in the display region C2 and it becomes uncertain whether a channel signal corresponding to code No. 4 at Walsh code length L=8 is present or not.

That is, there occur both a case where only the display region C2 appears to be present and a case where signals appear to be present at code numbers 4 and 5 of Walsh code length L=8, thus giving rise to the drawback that the measurement becomes indistinct.

It is an object of the present invention to eliminate these drawbacks and provide a multiplexed signal waveform quality display method whereby signals demodulated using such Walsh code lengths and Walsh codes as have been selected at a normal combinations can surely be displayed distinctively on the display screen.

The multiplexed signal quality display system is further provided, as shown in FIG. 1, with a diffusion code length setting updating means 34A, a diffusion code number setting updating means 34B, and a setting means 35.

In accordance with diffusion code length L and diffusion code number i generated respectively by the diffusion code length setting updating means 34A and the diffusion code number setting updating means 34B, the diffusion code generator 20 generates a diffusion code PN for each diffusion code length L so that the diffusion codes PN correspond to all the channels. In accordance with the diffusion code PN the demodulator 25 demodulates each channel signal at each diffusion code length.

In this embodiment there is added a construction wherein an ideal signal Ri is generated in the ideal signal generator 26 on the basis of data obtained by demodulation, then various parameters Δai, Δτi, Δθi, and Δω are generated in the parameter estimator 27 in accordance with the ideal signal Ri, and these parameters are fed back to the orthogonal transformer 17 for optimization to afford a signal Z(k) with few errors.

The signal Z(k) with few errors is inputted to the power coefficient calculator 31, which in turn calculates power coefficients ρi of the channels. The power coefficients ρi thus calculated in the power coefficient calculator 31 and the parameters ˆai·L, Δˆτi·L, Δˆθi·L, Δˆω, Δ0' outputted from the transformer 32 are stored in a memory 33A in accordance with respective diffusion code lengths and diffusion code numbers.

The setting means 35 sets a to-be-displayed channel (the channel of a signal transmitted by a communication device being measured) from among all the channels stored in the memory 33A and reads the power coefficient ρi and parameters of the channel thus set. In this example, therefore, electric power of the channel set in the setting means 35 is displayed on a calculation result display 33D.

Figure 8:
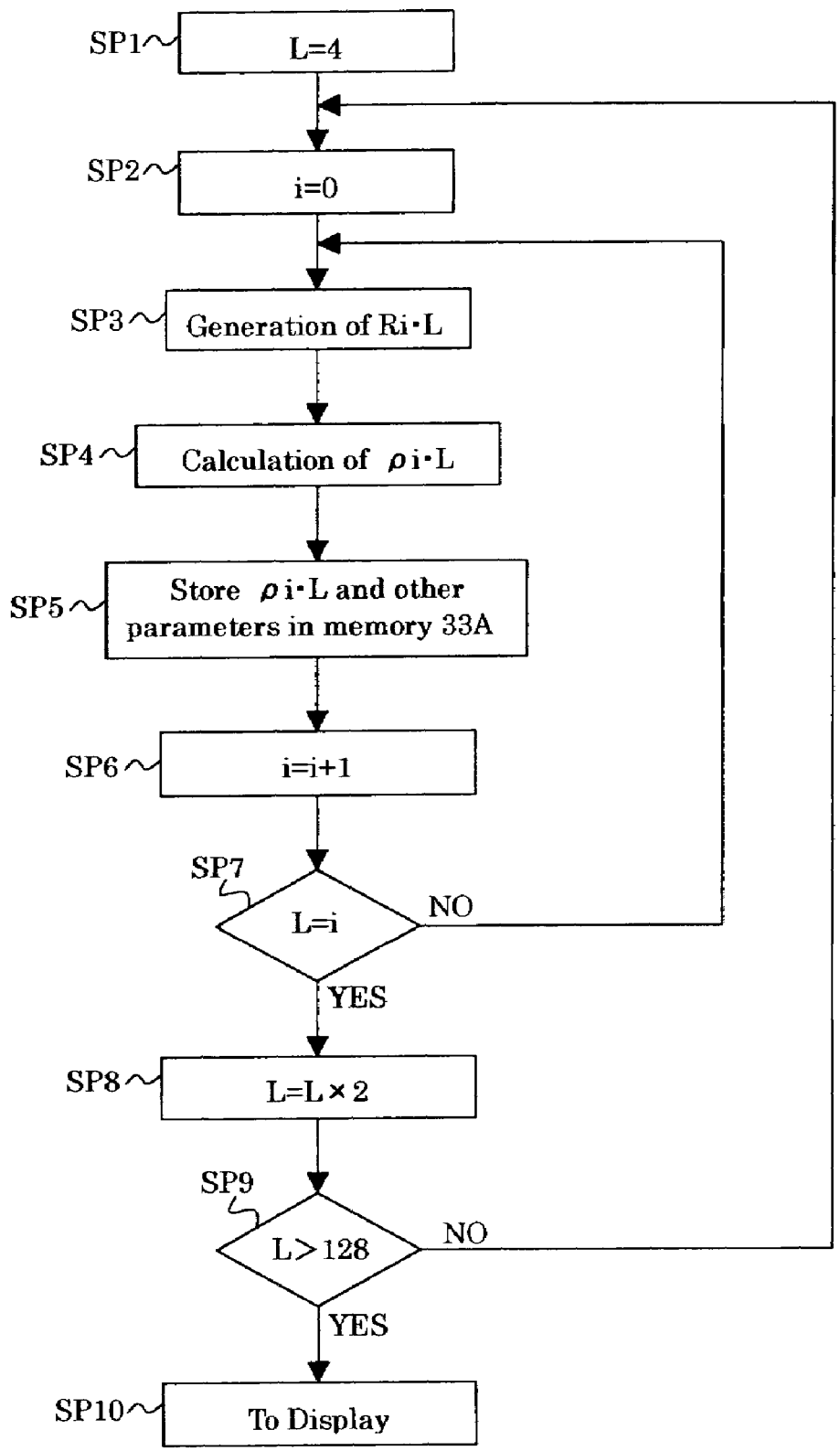
FIG. 8 is a flow chart showing the operation of a diffusion code length setting updating means 34A, that of a diffusion code number setting updating means 34B, and further showing in what state arithmetic processings are performed in various components.

FIG. 8 shows the operation of the diffusion code length setting updating means 34A and that of the diffusion code number setting updating means 34 and also shows in what state arithmetic processings are performed in various components.

In step SP1, Walsh code length as diffusion code length is initialized at L=4, then in step SP2, Walsh code (corresponding to channel number) as diffusion code number is set at i=0.

In step SP3, an ideal signal Ri·L based on Walsh code length L=4 and Walsh code i=0 is produced in the ideal signal generator 26.

In step SP4, parameters are estimated in the parameter estimator 27 in accordance with the ideal signal Ri·L and are then fed back to the orthogonal transformer 17 for optimization processing. Then, the power coefficient ρi·L is calculated on the basis of the measurement signal Z(k) after optimization processing and the diffusion code produced in the diffusion code generator 20.

In step SP5, the power coefficient ρi·L calculated in step SP4 and other parameters ˆai·L, Δˆτi·L, Δˆθi·L, Δˆω, τ0' are stored in the memory 33A.

In step SP6, the value of Walsh code i is updated as i+1, then in step SP7, the value of Walsh code length L and that of Walsh code i are compared with each other. If both disagree, the processing flow returns to step SP3. That is, in case of Walsh code length L=4, i=4 results from executing the steps SP3-SP7 four times, and the flow advances to step SP8.

In step SP8, the value L of Walsh code length is doubled for updating to L=8. In step SP9, a check is made to see if the value L of Walsh code length has become larger than the maximum value 128. If the answer is affirmative, the flow returns to step SP2.

In step SP2, initialization is made again to i=0 and the routine of steps SP3-SP7 is executed. With L=8, the routine of steps SP3-SP7 is executed eight times. In this eight-time execution, power coefficients ρi·L and parameters ˆai, Δˆτi, Δˆθi, Δˆω, τ0' for eight channels of 0-7 defined for Walsh code length of L=8 are calculated and are stored in the memory 33A.

In this way the Walsh code length L is updated in the order of 4, 8, 16, 32, 64, and 128, and power coefficient ρi·L and parameters ˆai, Δˆτi, Δˆθi, Δˆω, τ0', are stored in the memory 33A.

If it is detected in step SP9 that the value L of Walsh length has exceeded the maximum value of 128, the processing flow branches to step SP10.

In step SP10, a power coefficient of each channel is calculated from the Walsh code length as a desired diffusion code length set in the setting means 35 and also from an address which depends on the diffusion code number (Walsh code number), and a electric power of each channel is determined from the power coefficient ρi thus obtained. Power W can be calculated as follows from the power coefficient ρ·L:

$$W=10.0\times\log_{10}(\rho\cdot L)$$

This conversion to electric power can be done in the graphing means 33B for example.

Data converted to electric power can be graphed by the graphing means 33B, but in this example the level of electric power is represented in terms of a strip-like display region (bar graph) for each channel. Therefore, the length in Y-axis direction of the strip-like display region depends on the converted electric power value. In the present invention, moreover, the width (in X-axis direction) of the strip-like display region is determined correspondingly to the diffusion code length L.

In determining the said width, the width of the display region of channel belonging to L=4 in diffusion code length L is selected to the largest width W. The width is made corresponding to the value of diffusion code length L so that the larger the value of L, the narrower the width, like ½ of the width W in L=4 in case of the diffusion code length L=8, further, ½ width thereof, ¼ (W), in case of L=16, further, ½ width thereof, ⅛ (W), in case of L=32, . . . . By so doing it is possible to clearly display the relation of channel band widths given to the diffusion code lengths.

Figure 9:
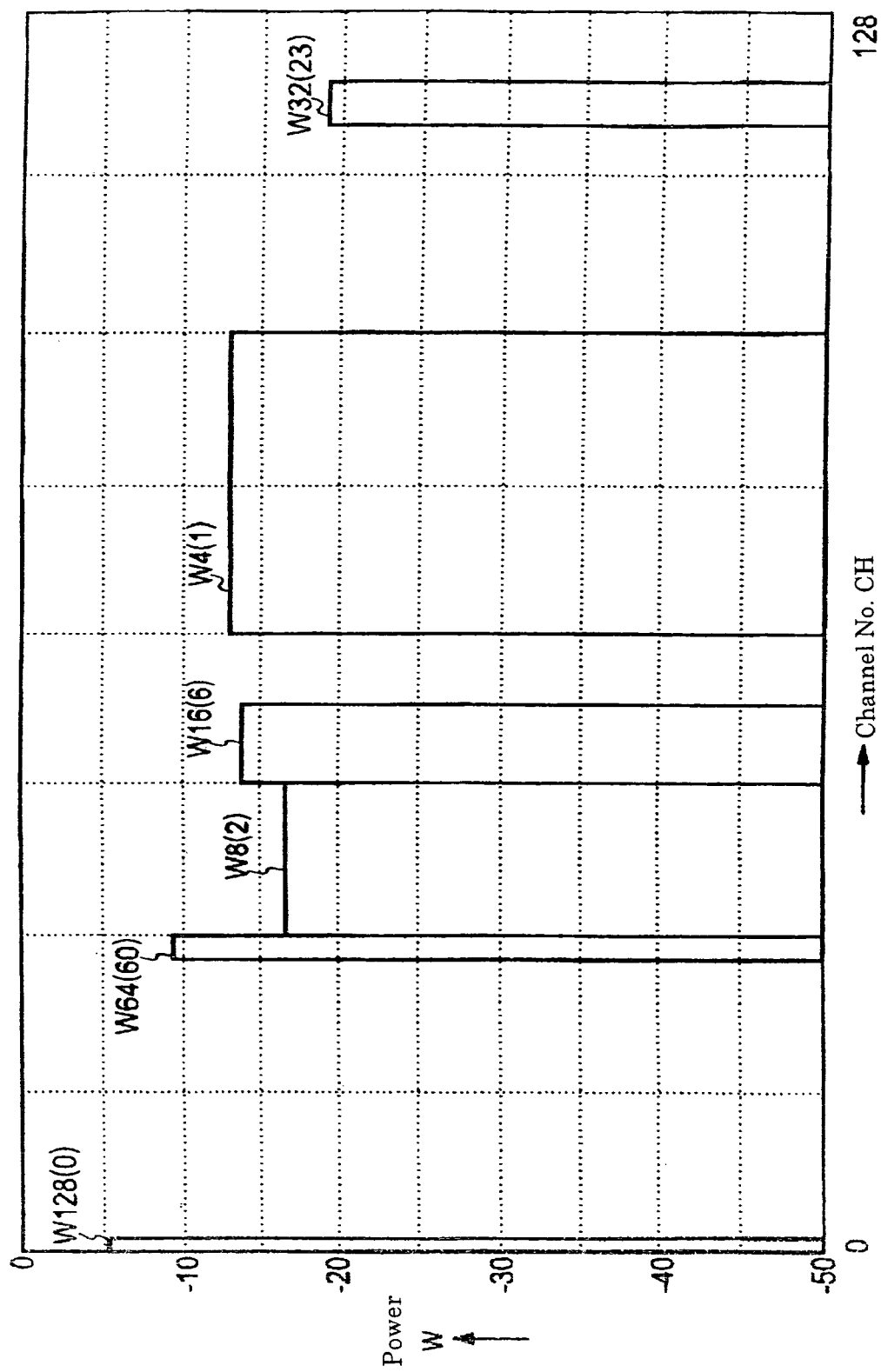
FIG. 9 is a diagram showing a display example in a first embodiment.

FIG. 9 shows an example of the display in question. W4 shown in FIG. 9 represents a display region given in terms of the diffusion code number "1" in diffusion code length L=4.

W8 represents a display region given in terms of the diffusion code number 2 in diffusion code length L=8.

W16 represents a display region given in terms of the diffusion code number 6 in diffusion code length L=16.

W32 represents a display region given in terms of diffusion code number 23 in diffusion code length L=32.

W64 represents a display region given in terms of diffusion code number 60 in diffusion code length L=64.

W128 represents a display region given in terms of diffusion code number 0 in diffusion code length L=128.

In FIG. 9, channel number and electric power are plotted along the axis of abscissa and the axis of ordinate, respectively.

From a read address of power coefficient which is read out of the memory 33A, the graphing means 33B can know the diffusion code length L to which the read power coefficient $\rho i$ belongs. On the basis of the value of the diffusion code length L, it is possible to determine the widths of the display regions W4, W8, W16, W32, W64, and W128.

In the graphing means 33B, moreover, colors can be affixed to the display regions W4, W8, W16, W32, W64, and W128 in accordance with the diffusion code number of the power coefficient read from the memory 33A. In the example of FIG. 9, the contour lines of the display regions W4, W8, W16, W32, W64, and W128 may be colored in black, blue, green, dark blue, yellow, and red, respectively. The thus-colored image data are stored in the image memory 33C and the thus-stored images are displayed on a display result display 33D.

The present invention further proposes that in the graphing means 33B the display positions in X-axis direction of the display regions W5-W128 be not defined by the diffusion code numbers shown in FIG. 3 but defined in accordance with Paley order of the diffusion code numbers.

According to Paley order, numbers are given in terms of bit numbers corresponding to Walsh code lengths as diffusion codes shown in FIG. 4A and the arrangement of bits obtained when the numbers are represented in binary is reversed. The numbers in such a reverse bit order become the numbers in Paley order.

More specifically, Paley order is as shown in FIG. 4B relative to the arrangement of Walsh codes shown in FIG. 4A. FIG. 5A shows an ordinary order of Walsh codes and FIG. 5B shows Paley order.

By defining the position on X axis of each channel in a multiplexing signal in accordance with Paley order there accrues an advantage that there can be made display without overlapping of display regions as in FIG. 10.

This is for the following reason. In this type of a communication device, as also explained previously, there is established a limitation so as to select channels in which diffusion codes are in an orthogonal relation for diminishing interference between channels. In case of selecting channels in accordance with the said limitation of channel selection, there arises a condition in which display regions overlap each other in display, as is illustrated in FIG. 7.

For remedying this drawback the present invention proposes that the display positions on X axis of the display regions W4-W128 be determined in accordance with Paley order.

FIG. 10 shows a state in which the overlapped state of both display regions C1 and C2 in FIG. 7 has been extinguished by making the display in accordance with Paley order. In case of the diffusion code length L=4, Paley order is like 0, 2, 1, 3 in terms of diffusion code numbers as in FIG. 5B. This order of diffusion code numbers 0, 2, 1, 3 corresponds to channel numbers 0, 1, 2, 3.

On the other hand, with the diffusion code length L=8, Paley order is like 0, 4, 2, 6, 1, 5, 3, 7 as is apparent from FIG. 4B.

The display region C1 shown in FIG. 7 displays an electric power of a signal which belongs to diffusion code number 4, so in accordance with Paley order the power is displayed in the position of channel No. 1 in L=8, as shown in FIG. 10.

On the other hand, the display region C2 shown in FIG. 7 displays an electric power of a signal which belongs to diffusion code number 2 in L=4, so in accordance with Paley order the power is displayed in the position of channel No. 1 in L=4.

As is apparent from FIG. 10, the display regions C1 and C2 do not overlap each other in display. In other words, channels selected in accordance with channel selecting conditions in a communication device (a portable telephone set) described previously never overlap in their channel positions when conversion is made into Paley order.

The reason for this will now be described with reference to FIG. 11. FIG. 11 shows a state in which diffusion code numbers in diffusion code length L=0 has been re-arranged in accordance with Paley order.

The channel selecting condition in a communication device explained previously is as follows: "A channel of a higher hierarchical level than the selected channel should not be selected." In this connection, it is apparent that when code number 1 in L=4 and code number 1 in L=8 are selected, the code relations are not orthogonal to each other. For example, in the case where a channel specified by code number 0 in L=4 is selected, it follows that channels specified by overlying code numbers 0, 4 in L=8, code numbers 0, 8, 4, 12 in L=16, and code numbers 0, 16, 8, 24, 4, 20, 12, 28 in L=32 do not satisfy the selection condition.

Likewise, when there is used a channel specified by code number 6 in L=8, channels specified by overlying code numbers 6, 14 in L=16 and code numbers 6, 22, 14, 30 in L=32 do not satisfy the channel selecting condition.

As is apparent from the above description, as to a channel selected in accordance with the channel selecting condition in a portable telephone set, if a display position of the channel is specified in accordance with Paley order, there never occurs a positional overlap in display.

This principle is also applicable to a method of determining a channel to be used in a base station for portable telephone.

Figure 12:
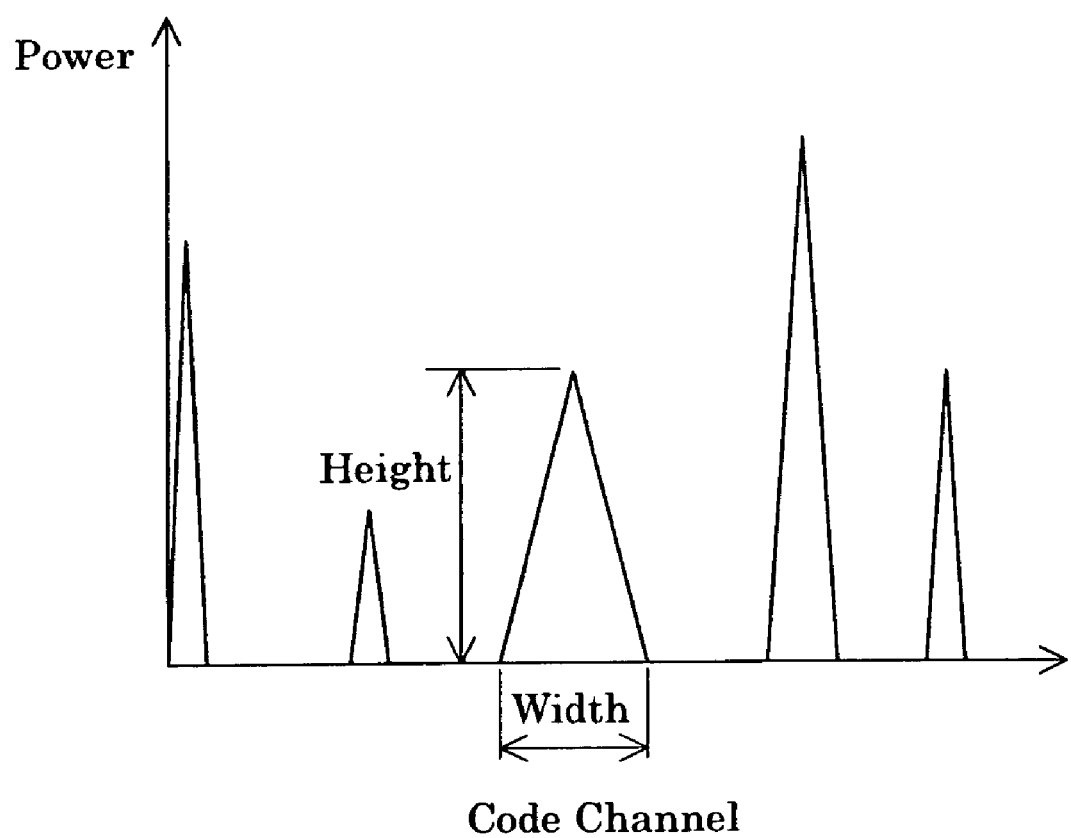
FIG. 12 is a diagram showing a display screen in a modification of the first embodiment.

Although the shape of display regions described in the first embodiment is strip-like, it suffices for each display region (graph) to have a length proportional to a converted power value and a width corresponding to the diffusion code length L. For example, the strip-like (rectangular) display region may be substituted by a such a triangular display region (graph) as shown in FIG. 12 which as a base length corresponding to the diffusion code length L and which has a height corresponding to the length proportional to a converted power value.

Second Embodiment

This second embodiment is different from the first embodiment in that a display region (graph) is disposed at a height proportional to a power value. Since the second embodiment is different in only its display screen from the first embodiment, reference will be made to only the display screen.

Figure 13:
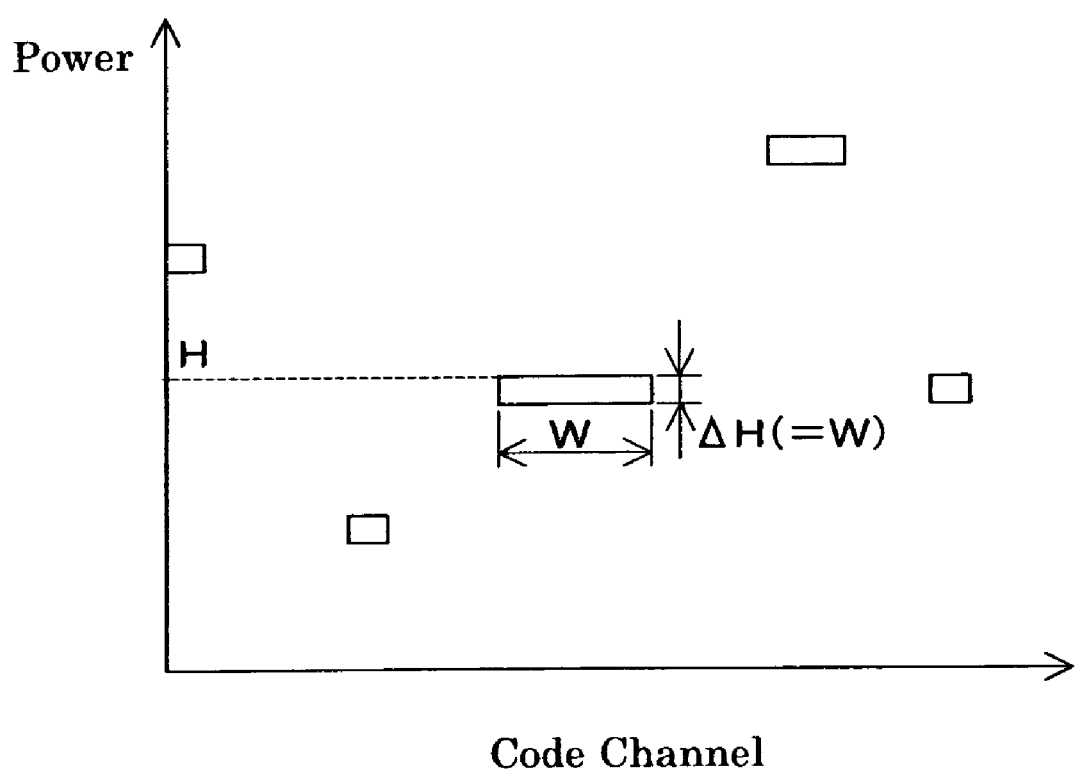
FIG. 13 is a diagram showing a display example in a second embodiment of the present invention.
Figure 14:
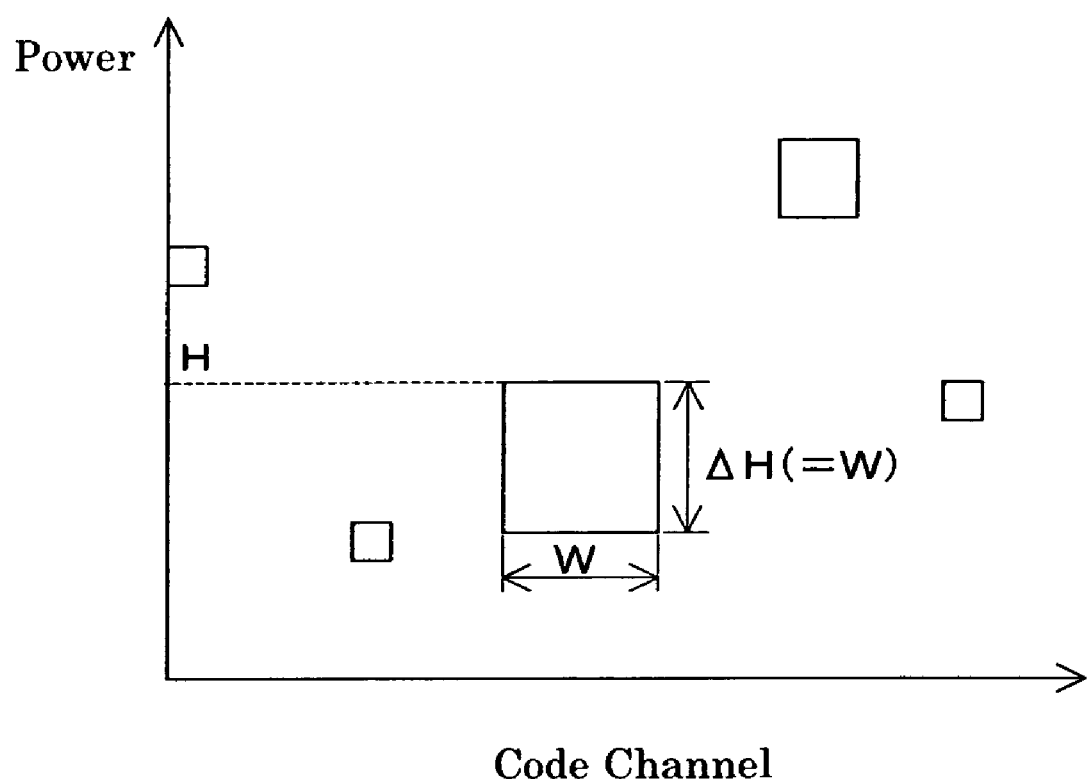
FIG. 14 is a diagram showing a display screen in a modification of the second embodiment.
Figure 15:
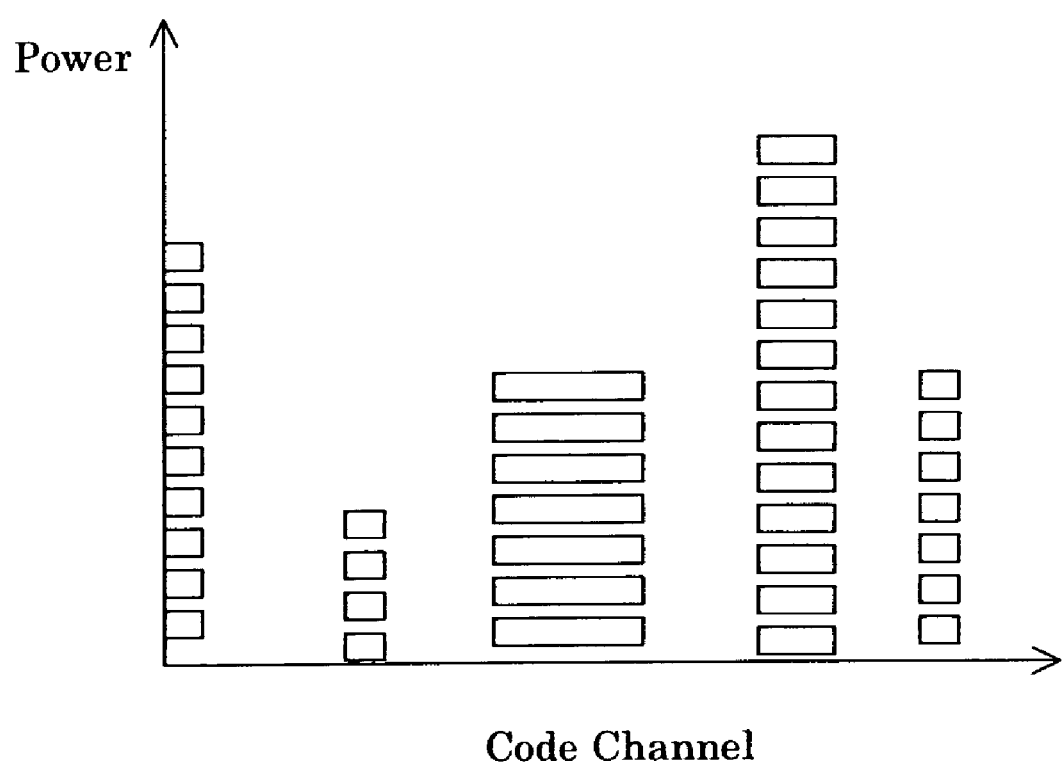
FIG. 15 is a diagram showing a display screen in a modification of the second embodiment.

FIG. 13 illustrates a display screen according to this second embodiment, in which a width W corresponds to the diffusion code length L and rectangular display regions (graphs) are disposed at heights H proportional to converted power values. The display regions (graphs) each have a predetermined height ΔH. A modification is shown in FIG. 14, in which the height ΔH of each display region (graph) is equal to the width W. A further modification is shown in FIG. 15, in which rectangular display regions (graphs) are arranged at predetermined intervals in the vertical direction. As in the first embodiment, the color of each display region (graph) may be changed for each Walsh code length or display regions may be arranged in Paley order in the width direction.

Third Embodiment

This third embodiment is different from the previous first and second embodiments in that the width of each display region (graph) is fixed. Since the third embodiment is different in only its display screen from the first embodiment, reference will be made below to only the display screen.

Figure 16:
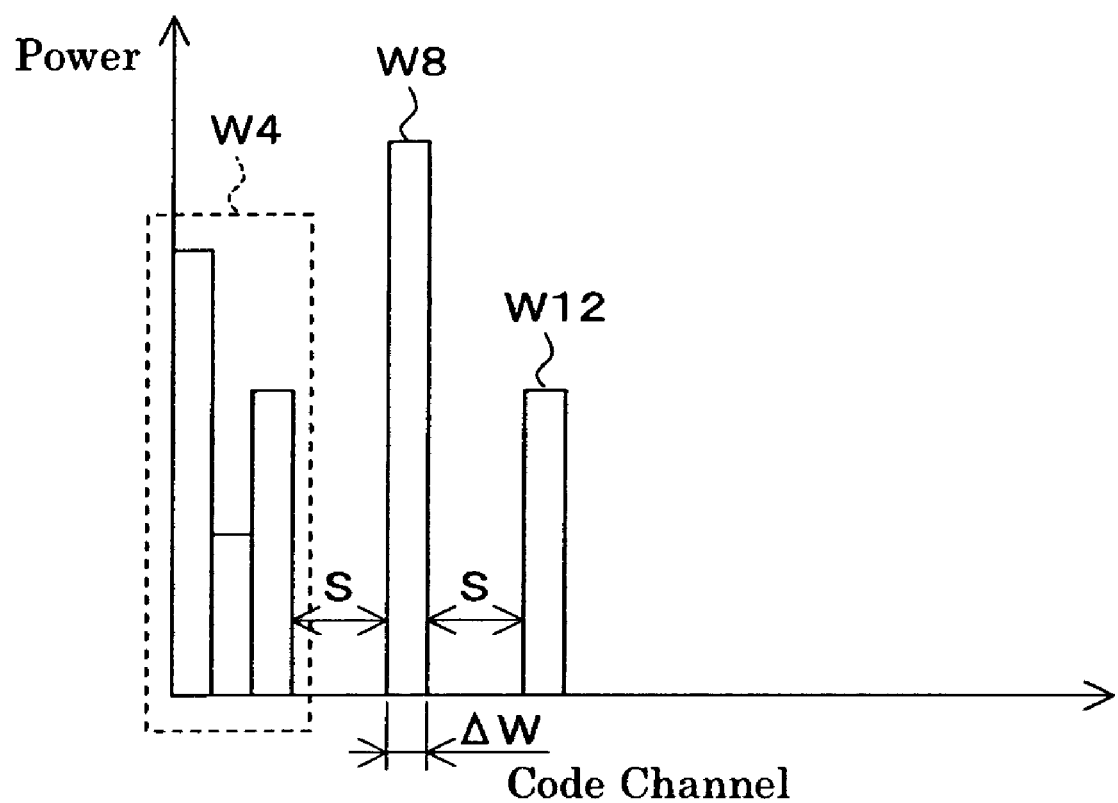
FIG. 16 is a diagram showing a display screen in a third embodiment of the present invention.

As shown in FIG. 16, display regions W4, W8, and W16 have respective common Walsh code lengths. More specifically, display regions W4, W8, and W16 have Walsh code lengths of 4, 8, and 16, respectively. Display regions (graphs) of individual channels in the display regions W4, W8, and W16 are displayed together in the width direction. Widths ΔW of individual channels' display regions (graphs) are equal to one another. The height of each channel display region (graph) corresponds to electric power. This is the same as in the first embodiment. In the display regions W4, W8, and W16, the spacing between individual channels' display regions (graphs) is nil or small. The spacing S between the display regions W4 and W8 or between the display regions W8 and W16 is larger than the spacing between individual channels' display regions (graphs) in the display regions W4, W8, and W16. As in the first embodiment, the color of each display region (graph) may be changed for each Walsh code length or display regions may be arranged in Paley order in the width direction.

Fourth Embodiment

This fourth embodiment is different from the first to third embodiments in that display regions (graphs) are sectorial. Since this fourth embodiment is different in only its display screen from the first embodiment, reference will be made below to only the display screen.

Figure 17:
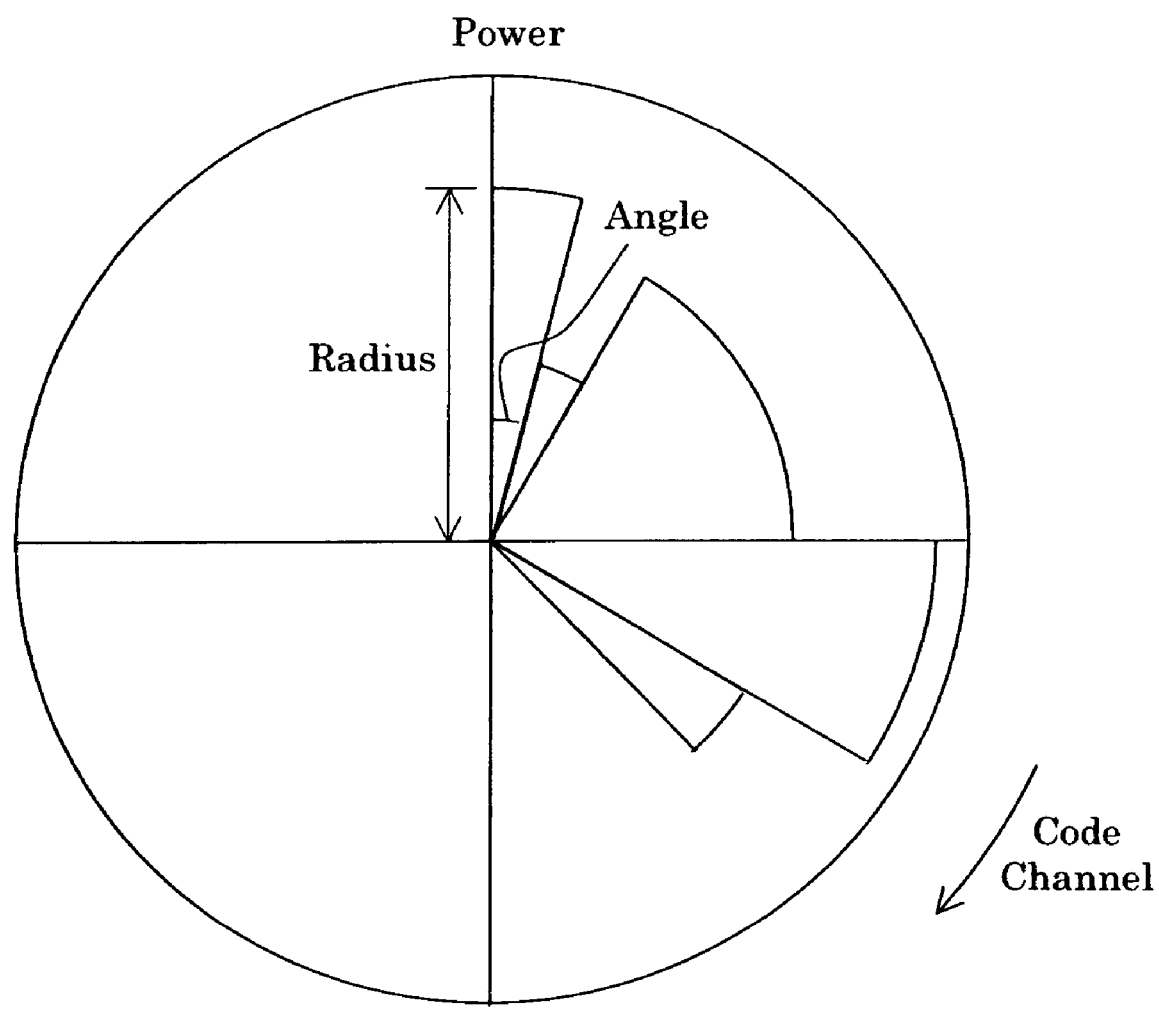
FIG. 17 is a diagram showing a display screen in a fourth embodiment of the present invention.

As shown in FIG. 17, display regions (graphs) are sectorial. Each sectorial shape has an angle corresponding to a band width which is determined by Walsh length corresponding to a channel to be measured, and has a radius proportional to the value of electric power. The color of each display region (graph) may be changed for each Walsh length as in the first embodiment.

Fifth Embodiment

This fifth embodiment is different from the first to fourth embodiment in that there are used display dots and not display regions (graphs). Since this fifth embodiment is merely different in only its display screen from the first embodiment, reference will be made below to only the display screen.

Figure 18:
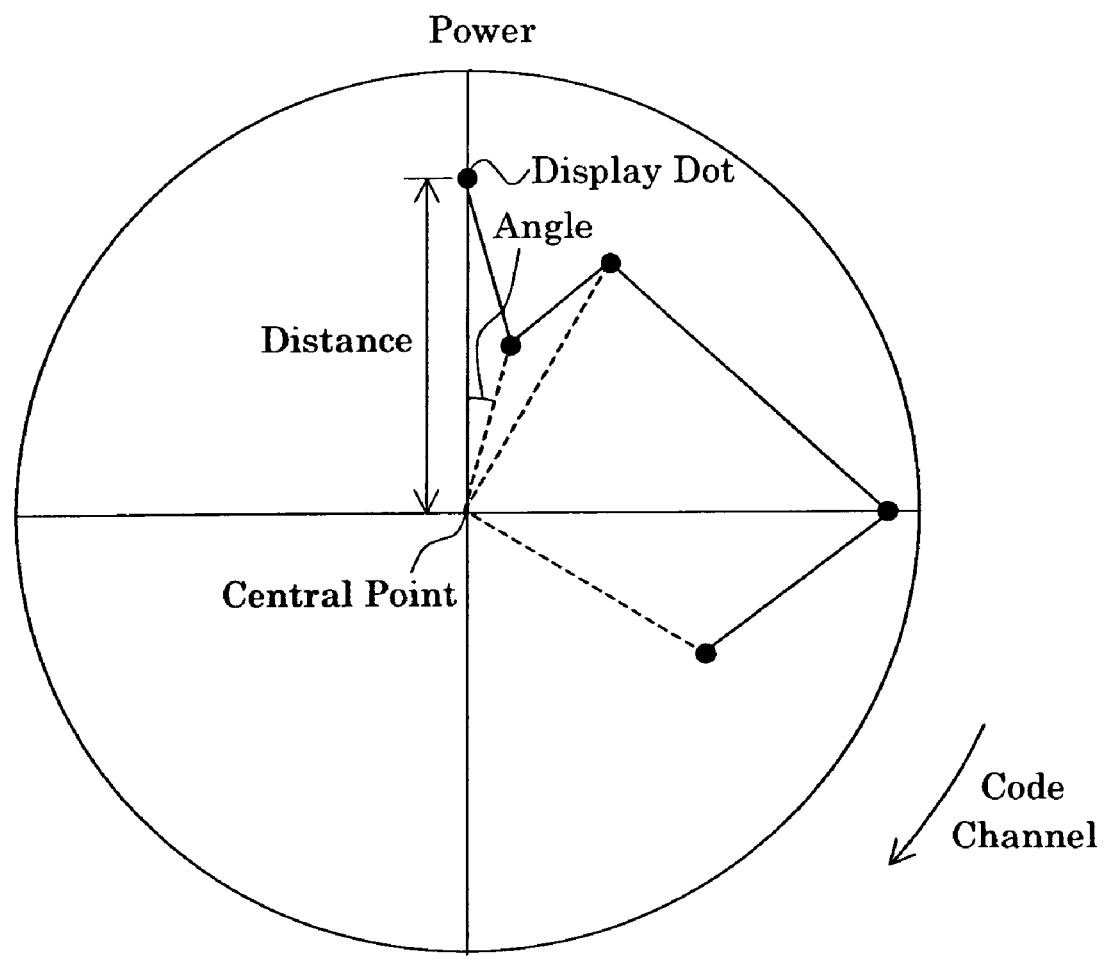
FIG. 18 is a diagram showing a display screen in a fifth embodiment of the present invention.
Figure 19:
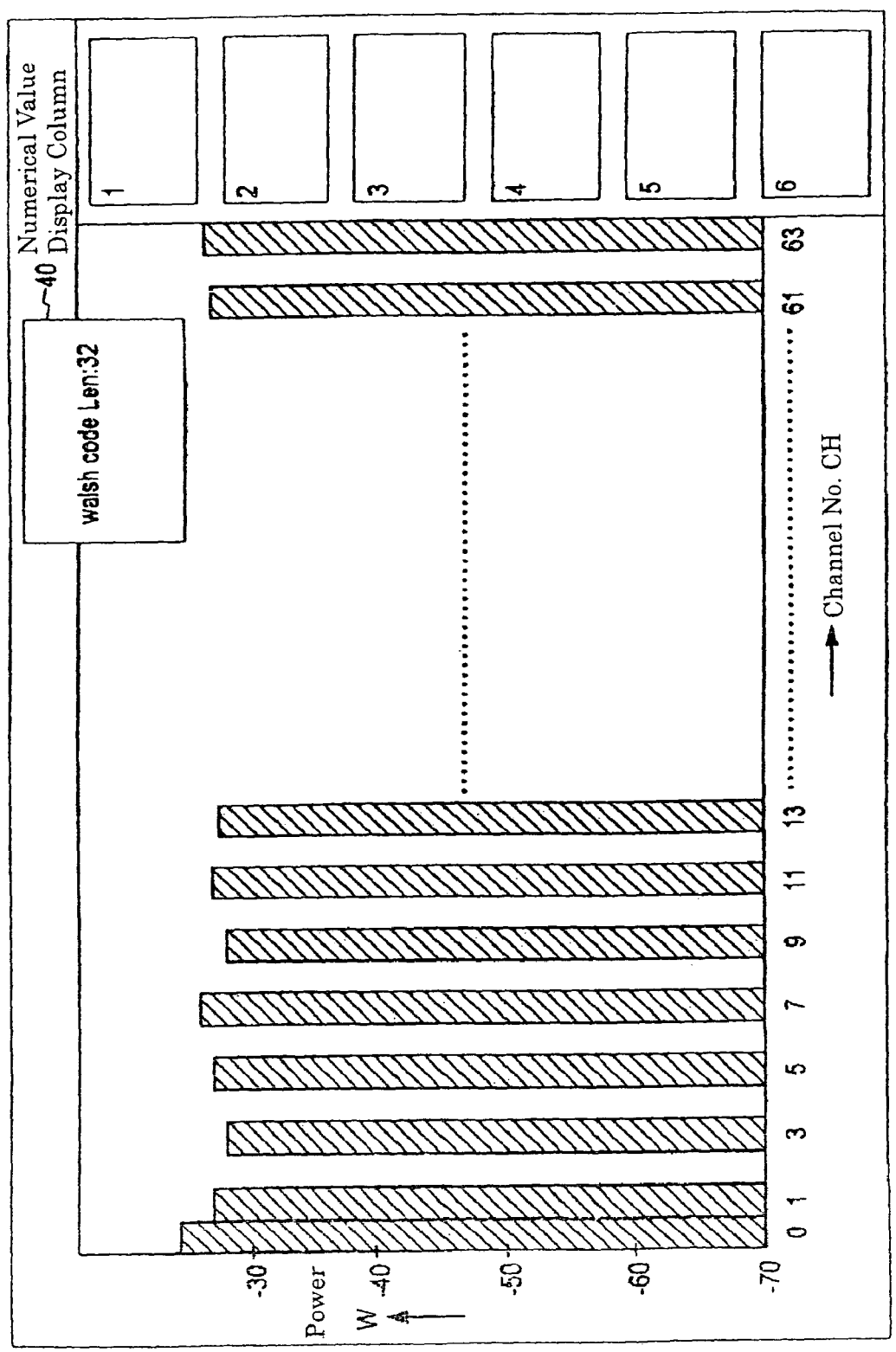
FIG. 19 is a diagram showing an example of power display in various channels according to the prior art.

As shown in FIG. 18, a display dot is displayed at a distance proportional to the value of electric power from a predetermined central point. Then, another display dot is displayed at a position having rotated from the aforesaid display dot by an angle corresponding to a band width which is determined by a diffusion code length corresponding to a channel to be measured. At this time, the adjacent display dots may be joined together by a line. It is as in the first embodiment that the color of each display dot may be changed for each Walsh code length.

The above embodiments can be implemented in the following manner. In a computer provided with a CPU, a hard disk, and a media (e.g., floppy disk and CD-ROM) reader, the media reader is allowed to read a media which stores programs for implementing the foregoing components and the read data are installed in a hard disk. Even with such a method it is possible to implement the functions described above.

According to the present invention, as described above, for example in case of testing a communication device which performs communication with use a multiplexed signal, such as a portable telephone set, the quality of a signal under communication can be displayed while making distinction to show of which channel the signal is. Particularly, since the width of each display region is changed according to the diffusion code length in display, it is possible to visually distinguish the difference in diffusion code length and hence there accrues an advantage that a measuring system convenient for use can be provided. Thus, the effect of the present invention is extremely outstanding in practical use.

What is claimed is:

1. A multiplexed signal quality display system for measuring the quality of a multiplexed signal from a communication device wherein a band width to be used and the number of communication channels capable of being accommodated are determined by a diffusion code length, and channels to be used having the number of communication channels, which are determined by a diffusion code length, are decided in terms of a diffusion code number affixed to the type of the diffusion code, to effect communication while ensuring multi-channel communication lines in one and same band, said system comprising:

a code length setting updating means which initializes a diffusion code length and which updates values from the initialized value up to a predetermined final value;

a diffusion code number setting updating means which, each time the diffusion code length set by said code length setting updating means is updated, updates diffusion code numbers corresponding to the number of channels determined by diffusion code lengths respectively, from an initialized value up to a predetermined final value;

a diffusion code generating means which generates a diffusion code in accordance with a diffusion code length and a diffusion code number generated respectively by said code length setting updating means and said diffusion code number setting updating means;

a demodulator means which demodulates the signal in each said channel in accordance with the diffusion code generated by said diffusion code generating means and said diffusion code length and said diffusion code number;

a power coefficient calculator which calculates a power coefficient of the signal demodulated by said demodulator means;

a memory which stores the power coefficient of each said channel calculated by said power coefficient calculation in accordance with the diffusion code length and the diffusion code number;

a setting means which reads a power coefficient from among the power coefficients stored in said memory while specifying desired diffusion code and diffusion code number;

a graphing means which converts the power coefficient read by said setting means into a power value, determines a length in Y-axis direction in accordance with said power value, and defines a width in X-axis direction in accordance with the diffusion code length to form a strip-like display region;

an image memory which stores image data graphed by said graphing means; and a calculation result display means which displays the image stored in said image memory.

2. A multiplexed signal quality display system comprising:

an electric power measuring means for measuring electric powers of signals to be measured in certain specific channels to be measured; and a calculation result display means for displaying graphs, said graphs respectively having widths corresponding to band widths which are determined by diffusion code lengths corresponding to said channels to be measured, said graphs respectively having lengths corresponding to the values of said electric powers, wherein said calculation result display means displays said graphs while arranging the graphs in the width direction in Paley order.

3. A multiplexed signal quality display system according to claim 2, wherein said graphs are rectangular in shape, having respectively said widths and said lengths as lengths of sides thereof.

4. A multiplexed signal quality display system according to claim 2, wherein said graphs are triangular in shape, having respectively said lengths as heights and said widths as base lengths.

5. A multiplexed signal quality display system comprising: an electric power measuring means for measuring electric powers of signals to be measured in certain specific channels to be measured; and a calculation result display means for displaying graphs, said graphs having widths corresponding to band widths which are determined by diffusion code lengths corresponding to said channels to be measured, said graphs being respectively arranged at heights corresponding to the values of said electric powers, wherein said calculation result display means displays said graphs while arranging the graphs in the width direction in Paley order.

6. A multiplexed signal quality display system according to claim 5, wherein said graphs are rectangular in shape, having predetermined heights.

7. A multiplexed signal quality display system according to claim 6, wherein said graphs are arranged in a vertical direction at predetermined intervals.

8. A multiplexed signal quality display system according to claim 5, wherein said graphs are square in shape.

9. A multiplexed signal quality display system comprising: an electric power measuring means for measuring electric powers of signals to be measured in certain specific channels to be measured;

and a calculation result display means which displays graphs together in a width direction for each diffusion code lengths corresponding to said channels to be measured, said graphs respectively having lengths proportional to the values of said electric powers and having a common width, wherein:

said calculation result display means takes the spacing between said graphs related to different diffusion code lengths wider than that between said graphs related to the same diffusion code length, and said calculation result display means displays said graphs while arranging the graphs in the width direction in Paley order.

10. A multiplexed signal quality display system comprising: an electric power measuring means for measuring electric powers of signals to be measured in certain specific channels to be measured; and a calculation result display means for displaying sectorial graphs, said sectorial graphs having angles corresponding to band widths which are determined by diffusion code lengths corresponding to said channels to be measured, said sectorial graphs having radius proportional to the values of said electric powers.

11. A multiplexed signal quality display system comprising:

an electric power measuring means for measuring electric powers of signals to be measured in certain specific channels to be measured; and a calculation result display means which displays display dots at distances proportional to the values of said electric powers from a predetermined central point in such a manner that from one said display dot is spaced another said display dot at a position having rotated by a predetermined angle from said one display dot, said angle corresponding to a band width which is determined by a diffusion code length corresponding to said channels to be measured.

12. A multiplexed signal quality display system according to claim 2, wherein said graphs have different colors for each said diffusion code lengths.

13. A multiplexed signal quality display system according to claim 11, wherein said display dots have different colors for each said diffusion code lengths.

14. A multiplexed signal quality display method comprising:

an electric power measuring step for measuring electric powers of signals to be measured in certain specific channels to be measured; and a calculation result display step for displaying graphs, said graphs respectively having widths corresponding to band widths which are determined by diffusion code lengths corresponding to said channels to be measured, said graphs respectively having lengths corresponding to the values of said electric powers, wherein said calculation result display step displays said graphs while arranging the graphs in the width direction in Paley order.

15. A multiplexed signal quality display method comprising:
- an electric power measuring step for measuring electric powers of signals to be measured in certain specific channels to be measured; and
- a calculation result display step for displaying graphs, said graphs having widths corresponding to band widths which are determined by diffusion code lengths corresponding to said channels to be measured, said graphs being respectively arranged at heights corresponding to the values of said electric powers, wherein said calculation result display step displays said graphs while arranging the graphs in the width direction in Paley order.

16. A multiplexed signal quality display method comprising:
- an electric power measuring step for measuring electric powers of signals to be measured in certain specific channels to be measured; and
- a calculation result display step which displays graphs together in a width direction for each diffusion code lengths corresponding to said channels to be measured, said graphs respectively having lengths proportional to the values of said electric powers and having a common width, wherein said calculation result display step takes the spacing between said graphs related to different diffusion code lengths wider than that between said graphs related to the same diffusion code length, and wherein said calculation result display step displays said graphs while arranging the graphs in the width direction in Paley order.

17. A multiplexed signal quality display method comprising:
- an electric power measuring step for measuring electric powers of signals to be measured in certain specific channels to be measured; and
- a calculation result display step for displaying sectorial graphs, said sectorial graphs having angles corresponding to band widths which are determined by diffusion code lengths corresponding to said channels to be measured, said sectorial graphs having radius proportional to the values of said electric powers.

18. A multiplexed signal quality display method comprising:
- an electric power measuring step for measuring electric powers of signals to be measured in certain specific channels to be measured; and
- a calculation result display step which displays display dots at distances proportional to the values of said electric powers from a predetermined central point in such a manner that from one said display dot is spaced another said display dot at a position having rotated by a predetermined angle from said one display dot, said angle corresponding to a band width which is determined by a diffusion code length corresponding to said channels to be measured.

19. A program of instructions for execution by the computer to perform a multiplexed signal quality display processing, said multiplexed signal quality display processing comprising:
- an electric power measuring process for measuring electric powers of signals to be measured in certain specific channels to be measured; and
- a calculation result display process for displaying graphs, said graphs respectively having widths corresponding to band widths which are determined by diffusion code lengths corresponding to said channels to be measured, said graphs respectively having lengths corresponding to the values of said electric powers, wherein said calculation result display process displays said graphs while arranging the graphs in the width direction in Paley order.

20. A program of instructions for execution by the computer to perform a multiplexed signal quality display processing, said multiplexed signal quality display processing comprising:
- an electric power measuring process for measuring electric powers of signals to be measured in certain specific channels to be measured; and
- a calculation result display process for displaying graphs, said graphs having widths corresponding to band widths which are determined by diffusion code lengths corresponding to said channels to be measured, said graphs being respectively arranged at heights corresponding to the values of said electric powers, wherein said calculation result display process displays said graphs while arranging the graphs in the width direction in Paley order.

21. A program of instructions for execution by the computer to perform a multiplexed signal quality display processing, said multiplexed signal quality display processing comprising:
- an electric power measuring process for measuring electric powers of signals to be measured in certain specific channels to be measured; and
- a calculation result display process which displays graphs together in a width direction for each diffusion code lengths corresponding to said channels to be measured, said graphs respectively having lengths proportional to the values of said electric powers and having a common width, wherein said calculation result display process takes the spacing between said graphs related to different diffusion code lengths wider than that between said graphs related to the same diffusion code length, and wherein said calculation result display process displays said graphs while arranging the graphs in the width direction in Paley order.

22. A program of instructions for execution by the computer to perform a multiplexed signal quality display processing, said multiplexed signal quality display processing comprising:
- an electric power measuring process for measuring electric powers of signals to be measured in certain specific channels to be measured; and
- a calculation result display process for displaying sectorial graphs, said sectorial graphs having angles corresponding to band widths which are determined by diffusion code lengths corresponding to said channels to be measured, said sectorial graphs having radius proportional to the values of said electric powers.

23. A program of instructions for execution by the computer to perform a multiplexed signal quality display processing, said multiplexed signal quality display processing comprising:
- an electric power measuring process for measuring electric powers of signals to be measured in certain specific channels to be measured; and
- a calculation result display process which displays display dots at distances proportional to the values of said electric powers from a predetermined central point in such a manner that from one said display dot is spaced another said display dot at a position having rotated by a predetermined angle from said one display dot, said angle corresponding to a band width which is determined by a diffusion code length corresponding to said channels to be measured.

24. A computer-readable medium having a program of instructions for execution by the computer to perform a multiplexed signal quality display processing, said multiplexed signal quality display processing comprising:
   an electric power measuring process for measuring electric powers of signals to be measured in certain specific channels to be measured; and
   a calculation result display process for displaying graphs, said graphs respectively having widths corresponding to band widths which are determined by diffusion code lengths corresponding to said channels to be measured, said graphs respectively having lengths corresponding to the values of said electric powers, wherein said calculation result display process displays said graphs while arranging the graphs in the width direction in Paley order.

25. A computer-readable medium having a program of instructions for execution by the computer to perform a multiplexed signal quality display processing, said multiplexed signal quality display processing comprising:
   an electric power measuring process for measuring electric powers of signals to be measured in certain specific channels to be measured; and
   a calculation result display process for displaying graphs, said graphs having widths corresponding to band widths which are determined by diffusion code lengths corresponding to said channels to be measured, said graphs being respectively arranged at heights corresponding to the values of said electric powers, wherein said calculation result display process displays said graphs while arranging the graphs in the width direction in Paley order.

26. A computer-readable medium having a program of instructions for execution by the computer to perform a multiplexed signal quality display processing, said multiplexed signal quality display processing comprising:
   an electric power measuring process for measuring electric powers of signals to be measured in certain specific channels to be measured; and
   a calculation result display process which displays graphs together in a width direction for each diffusion code lengths corresponding to said channels to be measured, said graphs respectively having lengths proportional to the values of said electric powers and having a common width,
   wherein said calculation result display process takes the spacing between said graphs related to different diffusion code lengths wider than that between said graphs related to the same diffusion code length, and wherein said calculation result display process displays said graphs while arranging the graphs in the width direction in Paley order.

27. A computer-readable medium having a program of instructions for execution by the computer to perform a multiplexed signal quality display processing, said multiplexed signal quality display processing comprising:
   an electric power measuring process for measuring electric powers of signals to be measured in certain specific channels to be measured; and
   a calculation result display process for displaying sectorial graphs, said sectorial graphs having angles corresponding to band widths which are determined by diffusion code lengths corresponding to said channels to be measured, said sectorial graphs having radius proportional to the values of said electric powers.

28. A computer-readable medium having a program of instructions for execution by the computer to perform a multiplexed signal quality display processing, said multiplexed signal quality display processing comprising:
   an electric power measuring process for measuring electric powers of signals to be measured in certain specific channels to be measured; and
   a calculation result display process which displays display dots at distances proportional to the values of said electric powers from a predetermined central point in such a manner that from one said display dot is spaced another said display dot at a position having rotated by a predetermined angle from said one display dot, said angle corresponding to a band width which is determined by a diffusion code length corresponding to said channels to be measured.

29. A multiplexed signal quality display method for measuring the quality of a multiplexed signal from a communication device wherein a band width to be used and the number of communication channels capable of being accommodated are determined by a diffusion code length, and channels to be used having the number of communication channels, which are determined by a diffusion code length, are decided in terms of a diffusion code number affixed to the type of the diffusion code, to effect communication while ensuring multi-channel communication lines in one and same band, said method comprising:
   a code length setting updating step which initializes a diffusion code length and which updates values from the initialized value up to a predetermined final value;
   a diffusion code number setting updating step which, each time the diffusion code length set by said code length setting updating step is updated, updates diffusion code numbers corresponding to the number of channels determined by diffusion code lengths respectively, from an initialized value up to a predetermined final value;
   a diffusion code generating step which generates a diffusion code in accordance with a diffusion code length and a diffusion code number generated respectively by said code length setting updating step and said diffusion code number setting updating step;
   a demodulation step which demodulates the signal in each said channel in accordance with the diffusion code generated by said diffusion code generating step and said diffusion code length and diffusion code number;
   a power coefficient calculation step which calculates a power coefficient of the signal demodulated by said demodulation step;
   a storing step which stores the power coefficient of each said channel calculated by said power coefficient calculation in accordance with the diffusion code length and the diffusion code number;
   a setting step which reads a power coefficient from among the power coefficients stored in said storing step while specifying desired diffusion code and diffusion code number;
   a graphing step which converts the power coefficient read by said setting step into a power value, determines a length in Y-axis direction in accordance with said power value, and defines a width in X-axis direction in accordance with the diffusion code length to form a strip-like display region;
   an image storing step which stores image data graphed by said graphing step; and a calculation result display step which displays the image stored in said image storing step.

30. A program of instructions for execution by the computer to perform a multiplexed signal quality display processing, for measuring the quality of a multiplexed signal from a communication device wherein a band width to be used and the number of communication channels capable of being accommodated are determined by a diffusion code length, and channels to be used having the number of communication channels, which are determined by a diffusion code length, are decided in terms of a diffusion code number affixed to the type of the diffusion code, to effect communication while ensuring multi-channel communication lines in one and same band, said multiplexed signal quality display processing comprising:

a code length setting updating process which initializes a diffusion code length and which updates values from the initialized value up to a predetermined final value;

a diffusion code number setting updating process which, each time the diffusion code length set by said code length setting updating process is updated, updates diffusion code numbers corresponding to the number of channels determined by diffusion code lengths respectively, from an initialized value up to a predetermined final value;

a diffusion code generating process which generates a diffusion code in accordance with a diffusion code length and a diffusion code number generated respectively by said code length setting updating process and said diffusion code number setting updating process;

a demodulation process which demodulates the signal in each said channel in accordance with the diffusion code generated by said diffusion code generating process and said diffusion code length and said diffusion code number;

a power coefficient calculation process which calculates a power coefficient of the signal demodulated by said demodulation process;

a storing process which stores the power coefficient of each said channel calculated by said power coefficient calculation in accordance with the diffusion code length and the diffusion code number;

a setting process which reads a power coefficient from among the power coefficients stored in said storing process while specifying desired diffusion code and diffusion code number;

a graphing process which converts the power coefficient read by said setting process into a power value, determines a length in Y-axis direction in accordance with said power value, and defines a width in X-axis direction in accordance with the diffusion code length to form a strip-like display region;

an image storing process which stores image data graphed by said graphing process;

and a calculation result display process which displays the image stored in said image storing process.

31. A computer-readable medium having a program of instructions for execution by the computer to perform a multiplexed signal quality display processing, for measuring the quality of a multiplexed signal from a communication device wherein a band width to be used and the number of communication channels capable of being accommodated are determined by a diffusion code length, and channels to be used having the number of communication channels, which are determined by a diffusion code length, are decided in terms of a diffusion code number affixed to the type of the diffusion code, to effect communication while ensuring multi-channel communication lines in one and same band, said multiplexed signal quality display processing comprising:

a code length setting updating process which initializes a diffusion code length and which updates values from the initialized value up to a predetermined final value;

a diffusion code number setting updating process which, each time the diffusion code length set by said code length setting updating process is updated, updates diffusion code numbers corresponding to the number of channels determined by diffusion code lengths respectively, from an initialized value up to a predetermined final value;

a diffusion code generating process which generates a diffusion code in accordance with a diffusion code length and a diffusion code number generated respectively by said code length setting updating process and said diffusion code number setting updating process;

a demodulation process which demodulates the signal in each said channel in accordance with the diffusion code generated by said diffusion code generating process and said diffusion code length and said diffusion code number;

a power coefficient calculation process which calculates a power coefficient of the signal demodulated by said demodulation process;

a storing process which stores the power coefficient of each said channel calculated by said power coefficient calculation in accordance with the diffusion code length and the diffusion code number;

a setting process which reads a power coefficient from among the power coefficients stored in said storing process while specifying desired diffusion code and diffusion code number;

a graphing process which converts the power coefficient read by said setting process into a power value, determines a length in Y-axis direction in accordance with said power value, and defines a width in X-axis direction in accordance with the diffusion code length to form a strip-like display region;

an image storing process which stores image data graphed by said graphing process; and a calculation result display process which displays the image stored in said image storing process.

32. A multiplexed signal quality display system for measuring the quality of a multiplexed signal from a communication device wherein a band width to be used and the number of communication channels capable of being accommodated are determined by a diffusion code length, and channels to be used having the number of communication channels, which are determined by a diffusion code length, are decided in terms of a diffusion code number affixed to the type of the diffusion code, to effect communication while ensuring multi-channel communication lines in one and same band, said system comprising:

a code length setting updating element which initializes a diffusion code length and which updates values from the initialized value up to a predetermined final value;

a diffusion code number setting updating element which, each time the diffusion code length set by said code length setting updating element is updated, updates diffusion code numbers corresponding to the number of channels determined by diffusion code lengths respectively, from an initialized value up to a predetermined final value;

a diffusion code generating element which generates a diffusion code in accordance with a diffusion code length and a diffusion code number generated respectively by said code length setting updating element and said diffusion code number setting updating element;

a demodulator element which demodulates the signal in each said channel in accordance with the diffusion code generated by said diffusion code generating element and said diffusion code length and said diffusion code number;

a power coefficient calculator which calculates a power coefficient of the signal demodulated by said demodulator element;

a memory which stores the power coefficient of each said channel calculated by said power coefficient calculation in accordance with the diffusion code length and the diffusion code number;

a setting element which reads a power coefficient from among the power coefficients stored in said memory while specifying desired diffusion code and diffusion code number;

a graphing element which converts the power coefficient read by said setting element into a power value, determines a length in Y-axis direction in accordance with said power value, and defines a width in X-axis direction in accordance with the diffusion code length to form a strip-like display region;

an image memory which stores image data graphed by said graphing element; and a calculation result display element which displays the image stored in said image memory.

33. A multiplexed signal quality display system comprising:

an electric power measuring element for measuring electric powers of signals to be measured in certain specific channels to be measured; and a calculation result display element for displaying graphs, said graphs respectively having widths corresponding to band widths which are determined by diffusion code lengths corresponding to said channels to be measured, said graphs respectively having lengths corresponding to the values of said electric powers, wherein said calculation result display element displays said graphs while arranging the graphs in the width direction in Paley order.

34. A multiplexed signal quality display system, comprising:

an electric power measuring element for measuring electric powers of signals to be measured in certain specific channels to be measured; and a calculation result display element for displaying graphs, said graphs having widths corresponding to band widths which are determined by diffusion code lengths corresponding to said channels to be measured, said graphs being respectively arranged at heights corresponding to the values of said electric powers, wherein said calculation result display element displays said graphs while arranging the graphs in the width direction in Paley order.

35. A multiplexed signal quality display system comprising:

an electric power measuring element for measuring electric powers of signals to be measured in certain specific channels to be measured; and a calculation result display element which displays graphs together in a width direction for each diffusion code lengths corresponding to said channels to be measured, said graphs respectively having lengths proportional to the values of said electric powers and having a common width, wherein said calculation result display element takes the spacing between said graphs related to different diffusion code lengths wider than that between said graphs related to the same diffusion code length, and wherein said calculation result display element displays said graphs while arranging the graphs in the width direction in Paley order.

36. A multiplexed signal quality display system comprising:

an electric power measuring element for measuring electric powers of signals to be measured in certain specific channels to be measured; and a calculation result display element for displaying sectorial graphs, said sectorial graphs having angles corresponding to band widths which are determined by diffusion code lengths corresponding to said channels to be measured, said sectorial graphs having radius proportional to the values of said electric powers.

37. A multiplexed signal quality display system comprising:

an electric power measuring element for measuring electric powers of signals to be measured in certain specific channels to be measured; and a calculation result display element which displays display dots at distances proportional to the values of said electric powers from a predetermined central point in such a manner that from one said display dot is spaced another said display dot at a position having rotated by a predetermined angle from said one display dot, said angle corresponding to a band width which is determined by a diffusion code length corresponding to said channels to be measured.

* * * * *